United States Patent
Hegge

(10) Patent No.: US 8,467,788 B2
(45) Date of Patent: Jun. 18, 2013

(54) BASE STATION AND CONTROL METHOD

(75) Inventor: Stephan Hegge, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 13/149,875

(22) Filed: May 31, 2011

(65) Prior Publication Data

US 2012/0052898 A1   Mar. 1, 2012

(30) Foreign Application Priority Data

Aug. 30, 2010   (JP) .................... 2010-192561

(51) Int. Cl.
*H04W 74/08* (2009.01)

(52) U.S. Cl.
USPC ........................ 455/436; 455/452.1

(58) Field of Classification Search
USPC ............... 455/436, 458, 522; 370/311, 316, 370/349
See application file for complete search history.

(56) References Cited

U.S. PATENT DOCUMENTS

2010/0105405 A1* 4/2010 Vujcic ............... 455/452.1
2011/0051609 A1  3/2011 Ishii et al.

FOREIGN PATENT DOCUMENTS

JP   2009-055356 A   3/2009

* cited by examiner

*Primary Examiner* — Sam Bhattacharya
(74) *Attorney, Agent, or Firm* — Fujitsu Patent Center

(57) ABSTRACT

A base station controls random access that includes non-contention random access where the base station allocates to each terminal, a dedicated code as a preamble. The base station includes a wireless communications interface; and a processor configured to measure non-contention random access load received by the wireless communications interface; to determine a dedicated code count, based on the non-contention random access load measured; and to control the non-contention random access using the dedicated code count determined.

15 Claims, 17 Drawing Sheets

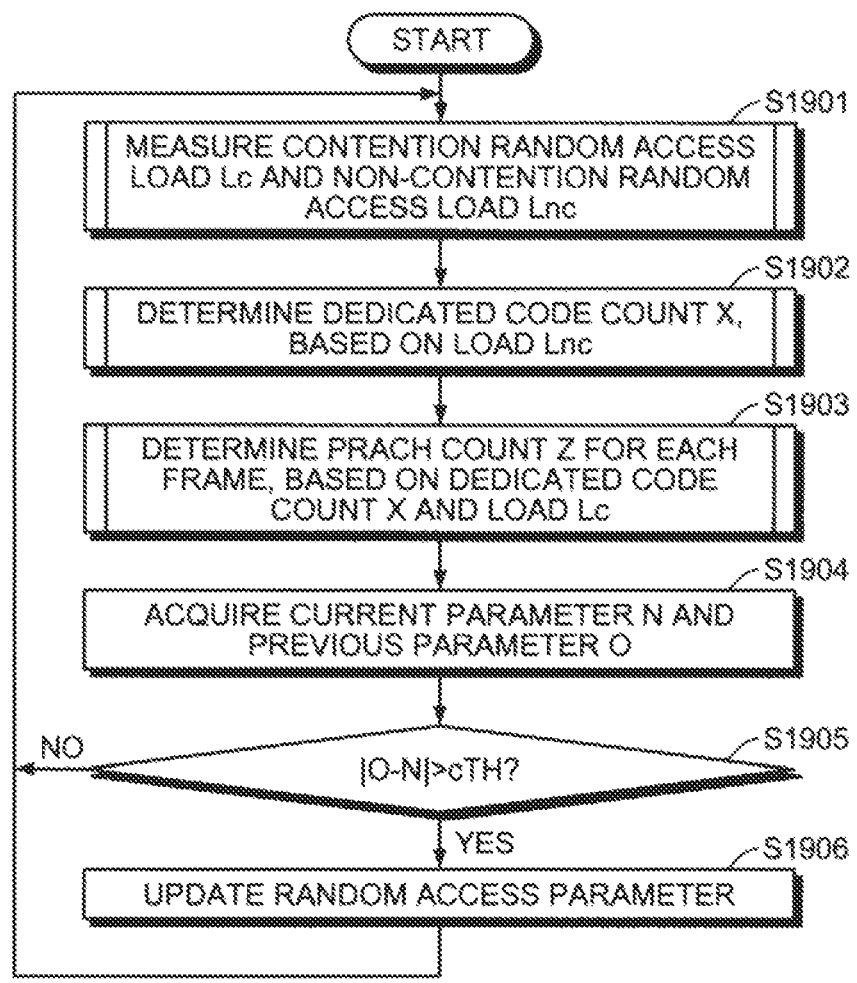

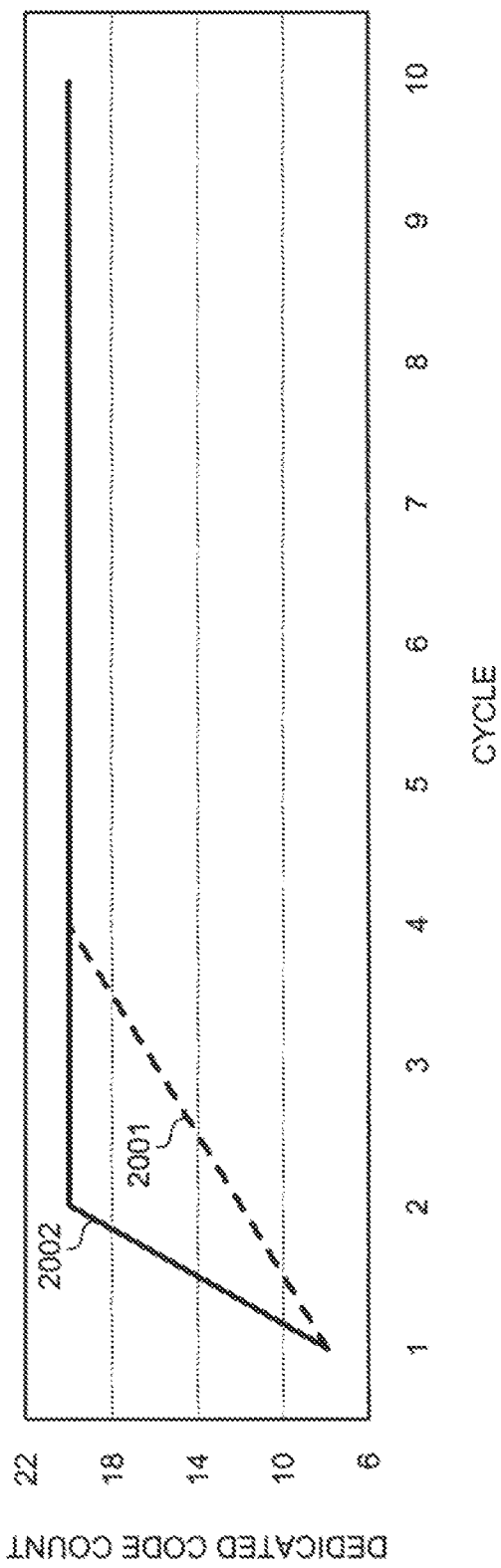

BASE STATION AND CONTROL METHOD

CROSS REFERENCE TO RELATED APPLICATIONS

This application is based upon and claims the benefit of priority of the prior Japanese Patent Application No. 2010-192561, filed on Aug. 30, 2010, the entire contents of which are incorporated herein by reference.

FIELD

The embodiments discussed herein are related to a base station and random access control.

BACKGROUND

In mobile communication systems such as those under Long Term Evolution (LTE), random access (RA) is used in processes for mobile communication terminals to initiate connections with base stations. Further, random access channels (RACH) are used as radio resources for random access. For example, a RACH can be set for 1 to 10 channels, on one radio frame. Furthermore, 64 preambles can be allocated per one RACH. As the preamble, random access code that is either shared code or dedicated code is used. Shared code is code that is randomly selected when a terminal begins access. Dedicated code is, for example, code that is temporarily allocated by a base station, to a terminal performing handover.

Random access includes contention random access and non-contention random access. In contention random access, a terminal transmits shared code as a preamble when making random access. In non-contention random access, the terminal transmits dedicated code as a preamble when making random access. In non-contention random access, a terminal can be identified by the dedicated code and therefore, compared to contention random access, the completion of random access processing is faster.

Meanwhile, to reduce operation expenditure of wireless network infrastructure in LTE, standardization of Self Organizing Networks (SON) in LTE is advancing. An objective of SON is to optimize the random access process. In the optimization of the random access process, delay caused by the random access process is minimized.

To optimize the random access process, a technology is known that measures RACH quality and based on the measured results, controls random access parameters (see, for example, Japanese Laid-Open Patent Publication No. 2009-55356). In the technology recited in Japanese Laid-Open Patent Publication No. 2009-55356, according to the direction in which RACH quality changes, the increase or decrease of a parameter is determined. Random access parameters include allocated time, frequency, code or space; initial transmission power; increased transmission power range; maximum number of retransmissions, number of signatures; number of sub-channels; etc.

Nevertheless, in the conventional technology above, the number of dedicated codes and the number of shared codes used in random access preambles are not considered as random access parameters. Consequently, dedicated codes become insufficient and fallback from non-contention random access to contention random access occurs, and shared codes become insufficient increasing contention random access collisions. As a result, random access is not performed efficiently, arising in a problem of random access consuming time.

Further, in the technology recited in Japanese Laid-Open Patent Publication No. 2009-55356, since a random access parameter is repeatedly increased and decreased until the RACH quality becomes optimized, it takes time until the random access parameter optimally converges, arising in a problem of deteriorated random access quality.

SUMMARY

According to an aspect of an embodiment, a base station controls random access that includes non-contention random access where the base station allocates to each terminal, a dedicated code as a preamble. The base station includes a wireless communications interface; and a processor configured to measure non-contention random access load received by the wireless communications interface; to determine a dedicated code count, based on the non-contention random access load measured; and to control the non-contention random access using the dedicated code count determined.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 19 is a flowchart of an example of processing by the base station according to the fifth example.

FIG. 20 is a graph depicting the time reduction for optimization of the dedicated code count.

DESCRIPTION OF EMBODIMENTS

Preferred embodiments of the present invention will be explained with reference to the accompanying drawings.

Figure 1:
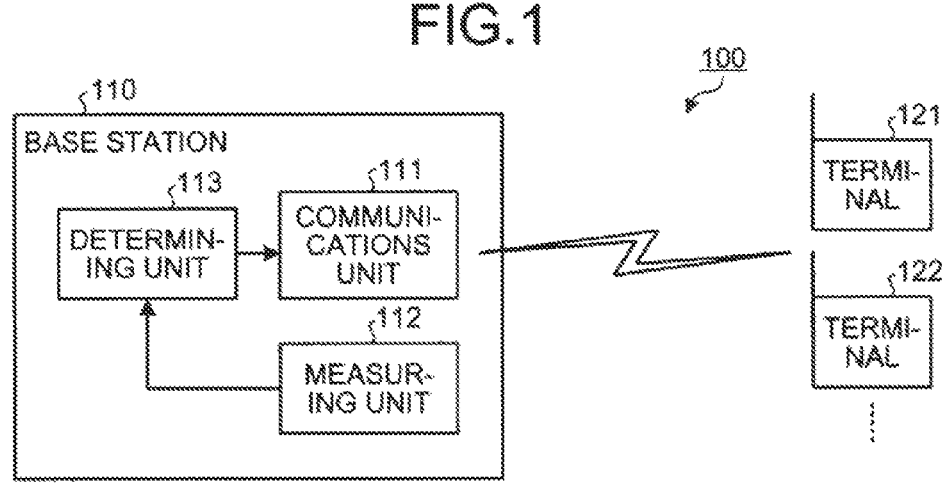
FIG. 1 is a diagram depicting a communication system according to an embodiment.

FIG. 1 is a diagram depicting a communication system according to an embodiment. As depicted in FIG. 1, a communication system 100 according to the embodiment includes a base station 110 and terminals 121, 122, . . . . The communication system 100 is, for example, an LTE compliant mobile communication system. The terminals 121, 122, . . . respectively are mobile communication terminals that perform random access to access the base station 110. Next, a configuration example of the base station 110 will be described.

The base station 110 includes a communications unit 111, a measuring unit 112, and a determining unit 113. The communications unit 111 controls random access between the base station 110 and the terminals 121, 122, . . . . The random access controlled by the communications unit 111 includes contention random access and non-contention random access.

Contention random access is, for example, random access in which a terminal selects a shared code as a preamble (contention preamble). Contention random access is performed by a terminal (terminals 121, 122, . . . ) that accesses the base station 110 for the first time or by a terminal that is capable of non-contention random access, but due to insufficient dedicated codes, transitions (falls back) to contention random access.

Non-contention random access is, for example, random access in which the base station 110 allocates a dedicated code to each given terminal as a preamble (dedicated preamble). A given terminal is, for example, a terminal that is connected to the base station 110. A terminal connected to the base station 110 is a terminal among the terminals 121, 122, . . . that performs handover to the base station 110, a terminal recovering uplink synchronicity with the base station 110, a terminal connecting to the base station 110 to perform a positioning service, etc. The communications unit 111 performs non-contention random access depending on the number of dedicated codes reported by the determining unit 113.

The measuring unit 112 measures the load Lnc of non-contention random access controlled by the communications unit 111. The measuring unit 112 reports to the determining unit 113, the measured non-contention random access load Lnc. For example, the measuring unit 112 counts the number of times the base station 110 receives a request for dedicated code (reservation request count) as the non-contention random access load Lnc.

The determining unit 113, based on the non-contention random access load Lnc reported by the measuring unit 112, determines the number of dedicated codes to be used in non-contention random access controlled by the communications unit 111. For example, the determining unit 113, based on the non-contention random access load Lnc, calculates a dedicated code insufficiency Pr and determines the dedicated code count such that the calculated insufficiency Pr becomes less than a threshold.

The dedicated code insufficiency Pr is, for example, the ratio that the reservation request count for dedicated codes exceeds the dedicated code count, at the same RACH timing (RA opportunity). The greater the number of dedicated codes, the smaller the dedicated code insufficiency Pr becomes. The determining unit 113 reports to the communications unit 111, the determined dedicated code count.

By this configuration, an appropriate number of reserved codes are established, enabling dedicated code insufficiency to be suppressed. As a result, transition to contention random access by (fallback of) a given terminal capable of non-contention random access, consequent to dedicated code insufficiency, can be suppressed. Therefore, time consuming fallback processing is reduced, enabling a reduction in the time consumed for random access. Further, increases in the time consuming contention random access are suppressed, enabling reductions in the time consumed for random access.

In a second configuration, the measuring unit 112 may measure the load Lc of contention random access controlled by the communications unit 111. For example, the measuring unit 112 measures the number of successful contention random accesses as the contention random access load Lc. The number of successful contention random accesses is, for example, the difference of the number of contention random access attempts less the number of contention random access collisions. The measuring unit 112 reports to the determining unit 113, the measured contention random access load Lc.

The determining unit 113, based on the contention random access load Lc reported by the measuring unit 112, determines the number of physical channels (PRACH) to be used for the random access controlled by the communications unit 111. For example, the determining unit 113, based on the contention random access load Lc, calculates contention random access collision rate Pa, and determines the number of physical channels such that the calculated collision rate Pa becomes less than a threshold.

The contention random access collision rate Pa is, for example, the ratio of contention random accesses that use the same shared code, at the same RACH timing. The greater the number of physical channels, the greater the number of shared codes becomes, whereby the contention random access collision rate Pa becomes lower. The determining unit 113 reports to the communications unit 111, the determined number of physical channels.

The communications unit 111 performs non-contention random access depending on the number of physical channels reported by the determining unit 113. By this configuration, an appropriate number of shared codes are established, enabling contention random access collisions to be suppressed. As a result, repeated contention random access attempts consequent to contention random access collision can be suppressed. Therefore, the time consumed for random access can be reduced.

In a third configuration, the base station 110 may have a configuration combining the first and the second configurations. For example, the measuring unit 112 measures the load Lnc of non-contention random access and the contention random access load Lc. The determining unit 113 determines the dedicated code count to be used in non-contention random access and the physical channel count to be used in random access.

Further, the determining unit 113 may determine the dedicated code count, and based on the determined dedicated code count and the contention random access load Lc, may determine the physical channel count. As a result, an appropriate number of dedicated codes are established, enabling fallback to be avoided and contention random access collisions to be held to a minimum.

The contention random access collision rate Pa varies consequent to the contention random access load Lc and the shared code selected by the terminal. On the contrary, the dedicated code insufficiency Pr varies consequent to the load Lnc of non-contention random access. Therefore, the contention random access collision rate Pa has a higher contingency that the dedicated code insufficiency Pr. Thus, by keeping contention random access collisions to a minimum, the time consumed for random access can be stabilized and reduced.

Hereinafter, the base station 110 according to the third configuration will be described.

Figure 2:
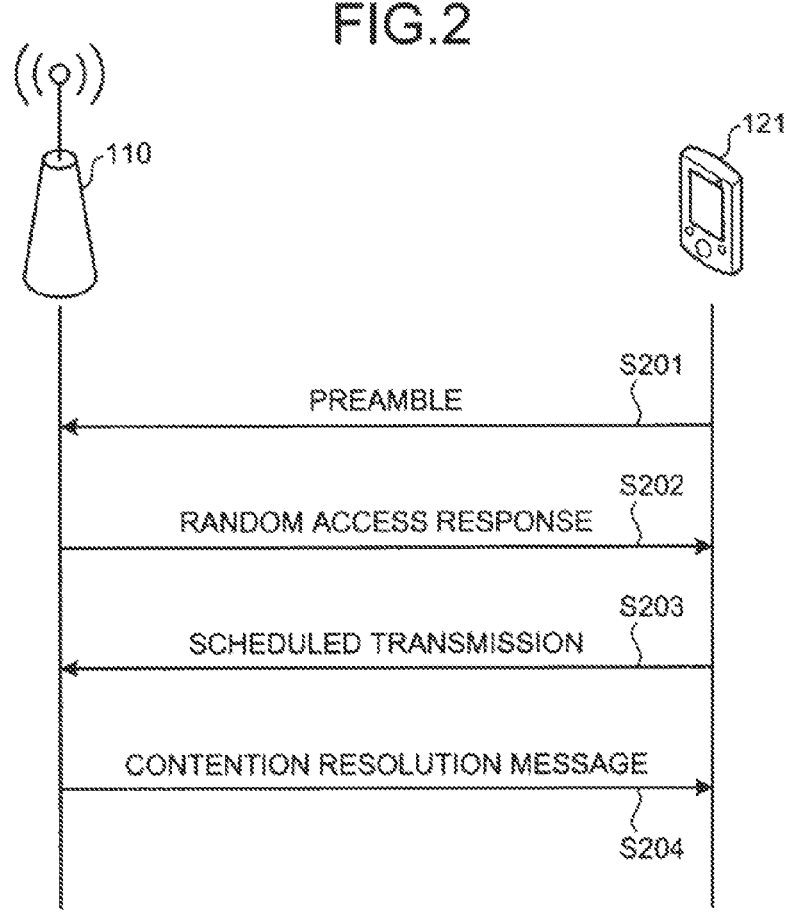
FIG. 2 is a sequence diagram of an example of operation for contention random access.

FIG. 2 is a sequence diagram of an example of operation for contention random access. In FIG. 2, an example will be described in which the terminal 121 accesses the base station 110 by contention random access. First, at a RACH timing, the terminal 121 transmits a preamble to the base station 110 (step S201). The shared code selected by the terminal 121, from among the shared codes that can be used in the cell, is used for the preamble transmitted at step S201.

Next, in response to the preamble transmitted at step S201, the base station 110 transmits a random access response (RAR) to the terminal 121 (step S202). The random access response transmitted at step S202 includes uplink scheduling information for the terminal 121 to transmit terminal information and information that indicates the preamble received by the base station 110 and the received RACH sub-frame of the preamble.

Next, based on the random access response including uplink scheduling information and received at step S202, the terminal 121 performs scheduled transmission to the base station 110 (step S203). In the scheduled transmission performed at step S203, for example, identification information of the terminal 121 is transmitted to the base station 110.

The base station 110 transmits a contention resolution message in response to the scheduled transmission performed at step S203 (step S204), and ends a series of operations. Stored in the contention resolution message transmitted at step S204 is the identification information of the terminal to which the base station 110 transmitted the random access response at step S202. The terminal to which the base station 110 transmitted the random access response at step S202 is the terminal 121 or a terminal that competed with the terminal 121.

At step S201, the terminal 121 and another terminal may transmit a preamble using the same shared code, at the same RACH timing. In such a case, the base station 110 stores the identification information of one of the terminals (the terminal 121 or the other terminal having the same shared code) into the contention resolution message.

Therefore, there are cases in which the contention resolution message transmitted at step S204 does not store the identification information of the terminal 121. In such a case, the terminal 121 determines that contention random access has failed, returns to step S201, and again performs contention random access. On the other hand, if the contention resolution message includes the identification information of the terminal 121, the terminal 121 determines that contention random access is successful and completes contention random access.

Thus, in contention random access, the shared code selected by the terminal 121 is transmitted as a preamble. Therefore, in contention random access, to avoid contention, scheduled transmission and contention resolution message transmission are performed. As a result, contention random access consumes time compared to non-contention random access. Further, in contention random access, collisions may occur and a terminal that has failed contention random access consequent to collision again performs contention random access. As a result, contention random access consumes time compared to non-contention random access.

Figure 3:
FIG. 3 is a sequence diagram of an example of operation for non-contention random access.

FIG. 3 is a sequence diagram of an example of operation for non-contention random access. In FIG. 3, an example will be described in which the terminal 122 accesses the base station 110 by non-contention random access. Steps S301 and S302 depicted in FIG. 3 are identical to steps S201 and S202 depicted in FIG. 2. However, the dedicated code allocated to the terminal 122 by the base station 110 is used for the preamble transmitted at step S301.

Thus, in non-contention random access, since the terminal 122 transmits, as a preamble, the dedicated code allocated to the terminal 122 by the base station 110, the base station 110 is able to identify the terminal 122 by the preamble. Therefore, random access is completed without performing scheduled transmission, contention resolution message transmission, etc.

As a result, non-contention random access is completed in less time compared to contention random access. Further, in non-contention random access, since collision of the preamble does not occur, the terminal 122 can connect to the base station 110 in one non-contention random access attempt.

Figure 4:
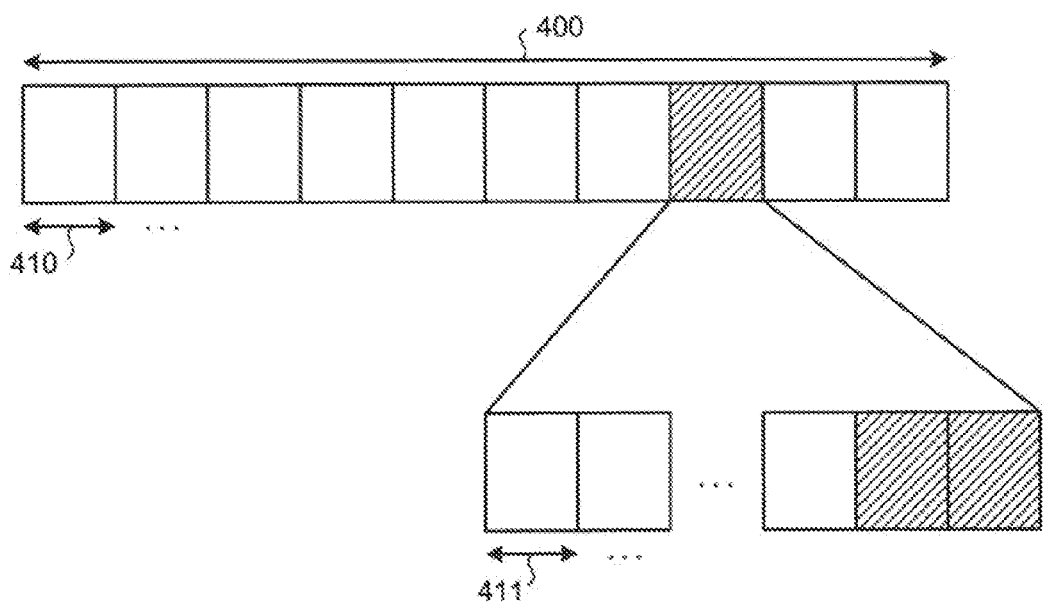
FIG. 4 is a diagram of an example of a radio frame.

FIG. 4 is a diagram of an example of a radio frame. A radio frame 400 depicted in FIG. 4 is an example of an uplink radio frame from the terminals 121, 122, . . . to the base station 110. The length of the radio frame 400 is 10 [ms]. The radio frame 400 includes ten sub-frames 410. The length of a sub-frame 410 is 1 [ms].

Among the ten sub-frames 410, a sub-frame indicated by hatching represents a RACH-use sub-frame (PRACH), while other sub-frames 410 are data-use sub-frames. The base station 110, as a random access parameter, sets the number of sub-frames to be used for RACH (PRACH count), among the ten sub-frames 410.

In a RACH-use sub-frame 410, 64 codes 411 can be stored. Among the 64 codes 411, a code indicated by hatching represents a dedicated code, while other codes are shared codes. The base station 110, as a random access parameter, sets the dedicated code count among the 64 codes 411.

Figure 5:
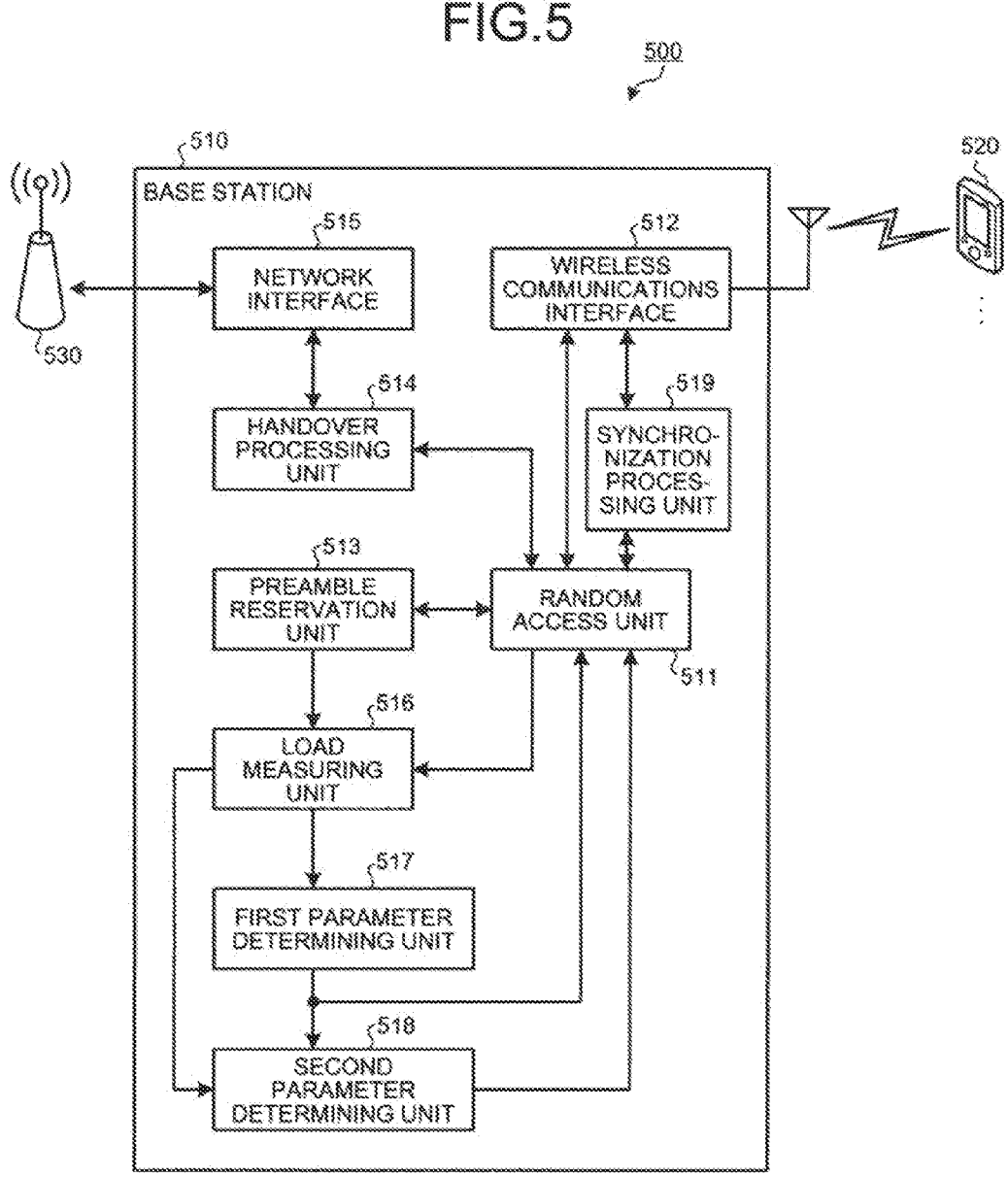
FIG. 5 is a diagram depicting the communication system according to a first example.

FIG. 5 is a diagram depicting the communication system according to a first example. As depicted in FIG. 5, a communication system 500 according to the first example includes a base station 510, a terminal group 520, and a base station 530. The base station 510 corresponds to the base station 110 depicted in FIG. 1. The terminal group 520 corresponds to the terminals 121, 122, . . . depicted in FIG. 1. The base station 530 is a base station near the base station 510.

The base station 510 includes a random access unit 511, a wireless communications interface 512, a preamble reservation unit 513, a handover processing unit 514, a network interface 515, a load measuring unit 516, a first parameter determining unit 517, a second parameter determining unit 518, and a synchronization processing unit 519.

The random access unit 511 is a component corresponding to the communications unit 111 depicted in FIG. 1. The random access unit 511 controls random access by the terminal group 520 to the base station 510, via the wireless communications interface 512. For example, the random access unit 511 performs the base station 110 operations depicted in FIGS. 2 and 3.

Further, the random access unit 511, via the wireless communications interface 512, broadcasts random access parameters to the terminal group 520. A random access parameter includes, for example, allocated time, frequency, code or space; initial transmission power; increased transmission power range; maximum number of retransmissions; number of signatures; number of sub-channels; etc.

Upon receiving handover notification from the handover processing unit 514, the random access unit 511 outputs a preamble request to the preamble reservation unit 513. Subsequently, the random access unit 511 outputs to the handover processing unit 514, the preamble (dedicated code) received from the preamble reservation unit 513 in response to the preamble request.

Upon receiving from the synchronization processing unit 519, a random access request related to a terminal included in the terminal group 520, the random access unit 511 transmits a preamble request to the preamble reservation unit 513. Subsequently, the random access unit 511 transmits to the terminal of the terminal group 520, the preamble (dedicated code) received from the preamble reservation unit 513 in response to the preamble request.

When the non-contention random access by the preamble (dedicated code) acquired from the preamble reservation unit 513 is completed, the random access unit 511 outputs to the preamble reservation unit 513, random access completion notification, whereby the preamble is released. Furthermore, the random access unit 511 controls random access by the parameters received from the first parameter determining unit 517 and the second parameter determining unit 518.

The preamble reservation unit 513 reserves preambles (dedicated codes) used in non-contention random access. Upon receiving a preamble request from the random access unit 511, the preamble reservation unit 513 reserves an available dedicated code and transmits the reserved dedicated code (as a preamble) to the random access unit 511.

The handover processing unit 514 performs handover of the terminal from the base station 530 to the base station 510, via the network interface 515. For example, the base station 530 acquires, via the network interface 515, a handover request from the base station 530 and determines whether the handover based on the acquired handover request is possible. For example, the handover processing unit 514 determines whether the base station 510 has a resource available for handover. If the handover processing unit 514 has determined that handover is possible, the handover processing unit 514 outputs handover notification to the random access unit 511.

The handover processing unit 514 acquires the preamble (dedicated code) output from the random access unit 511 in response to the handover notification. Subsequently, via the network interface 515, the handover processing unit 514 transmits to the base station 530, notification of handover authorization that includes the acquired preamble. If the handover processing unit 514 determines that handover is not possible, via the network interface 515, the handover processing unit 514 transmits to the base station 530 notification of handover refusal.

The load measuring unit 516 is a component that corresponds to the measuring unit 112 depicted in FIG. 1. For example, the load measuring unit 516 measures the load Lnc of non-contention random access controlled by the random access unit 511. For example, the load measuring unit 516 counts, as the load Lnc, the number of reservation requests made to the base station 510 for a preamble (non-contention random access attempts). The preamble reservation request count, for example, can be determined by monitoring the preamble reservation unit 513 and counting the number of preamble requests transmitted from the random access unit 511 to the preamble reservation unit 513. The load measuring unit 516 outputs to the first parameter determining unit 517, the measured non-contention random access load Lnc.

The load measuring unit 516 measures the load Lc of contention random access controlled by the random access unit 511. For example, the load measuring unit 516 counts, as the load Lc, the number of successful contention random accesses. The number of successful contention random accesses, for example, can be determined by monitoring the random access unit 511 and counting the number of contention resolution messages transmitted by the random access unit 511 to the terminal. The load measuring unit 516 outputs to the second parameter determining unit 518, the measured contention random access load Lc.

Further, the load measuring unit 516 monitors the preamble reservation unit 513 and acquires the period from preamble reservation until release (reservation period Mrt), for successful non-contention random accesses. The load measuring unit 516 outputs to the first parameter determining unit 517, the acquired reservation period Mrt.

The first parameter determining unit 517 and the second parameter determining unit 518 are components corresponding to the determining unit 113 depicted in FIG. 1. The first parameter determining unit 517, based on the non-contention random access load Lnc output from the load measuring unit 516 and the reservation period Mrt, determines a dedicated code count X for non-contention random access controlled by the random access unit 511. The first parameter determining unit 517 outputs to the random access unit 511 and the second parameter determining unit 518, the determined dedicated code count X.

The second parameter determining unit 518 determines a PRACH count Z for random access controlled by the random access unit 511. For example, the second parameter determining unit 518, based on the contention random access load Lc from the load measuring unit 516 and the dedicated code count X from the first parameter determining unit 517, determines the PRACH count Z. The second parameter determining unit 518 outputs to the random access unit 511, the determined PRACH count Z.

The synchronization processing unit 519 communicates, via the wireless communications interface 512, with the terminal group 520 and performs synchronization processing between the base station 510 and the terminal group 520. For example, the synchronization processing unit 519 detects among the terminal group 520, a terminal that is connected to the base station 510 and that has lost uplink synchronization with the base station 510 and outputs to the random access unit 511, a random access request from the detected terminal, requesting random access. As a result, a preamble is transmitted to the terminal that has lost synchronization, whereby the terminal performs non-contention random access.

Further, the base station 510 may include a service unit related to a positioning service. For example, the service unit, via the wireless communications interface 512, communicates with the terminal group 520 and receives random access requests associated with the positioning service. The service unit, upon receiving a random access request, transmits to the random access unit 511, a random access request.

The random access unit 511, upon acquiring the random access request associated with the positioning service, outputs to the preamble reservation unit 513, a preamble request. Subsequently, the random access unit 511 transmits to the terminal that has requested the positioning service among the terminal group 520, the preamble (dedicated code) received from the preamble reservation unit 513 in response to the preamble request. Consequently, the terminal can perform non-contention random access using the reserved preamble.

When the base station 530 decides to handover to the base station 510, a terminal in the cell of the base station 530, the base station 530 transmits to the base station 510, a handover request requesting handover to the base station 510. Subsequently, upon receipt of notification of handover authorization from the base station 510 in response to the handover request, the base station 530 causes the terminal to execute non-contention random access to the base station 510 that used a preamble (dedicated code) included in the notification of handover authorization. Further, upon receipt of notification of non-authorization of handover from the base station 510 in response to the handover request, the base station 530 terminates handover of the terminal to the base station 510.

The random access unit 511, the preamble reservation unit 513, the handover processing unit 514, the load measuring unit 516, the first parameter determining unit 517, the second parameter determining unit 518, and the synchronization processing unit 519, for example, can be implemented by one or more digital signal processors (DSP).

Figure 6:
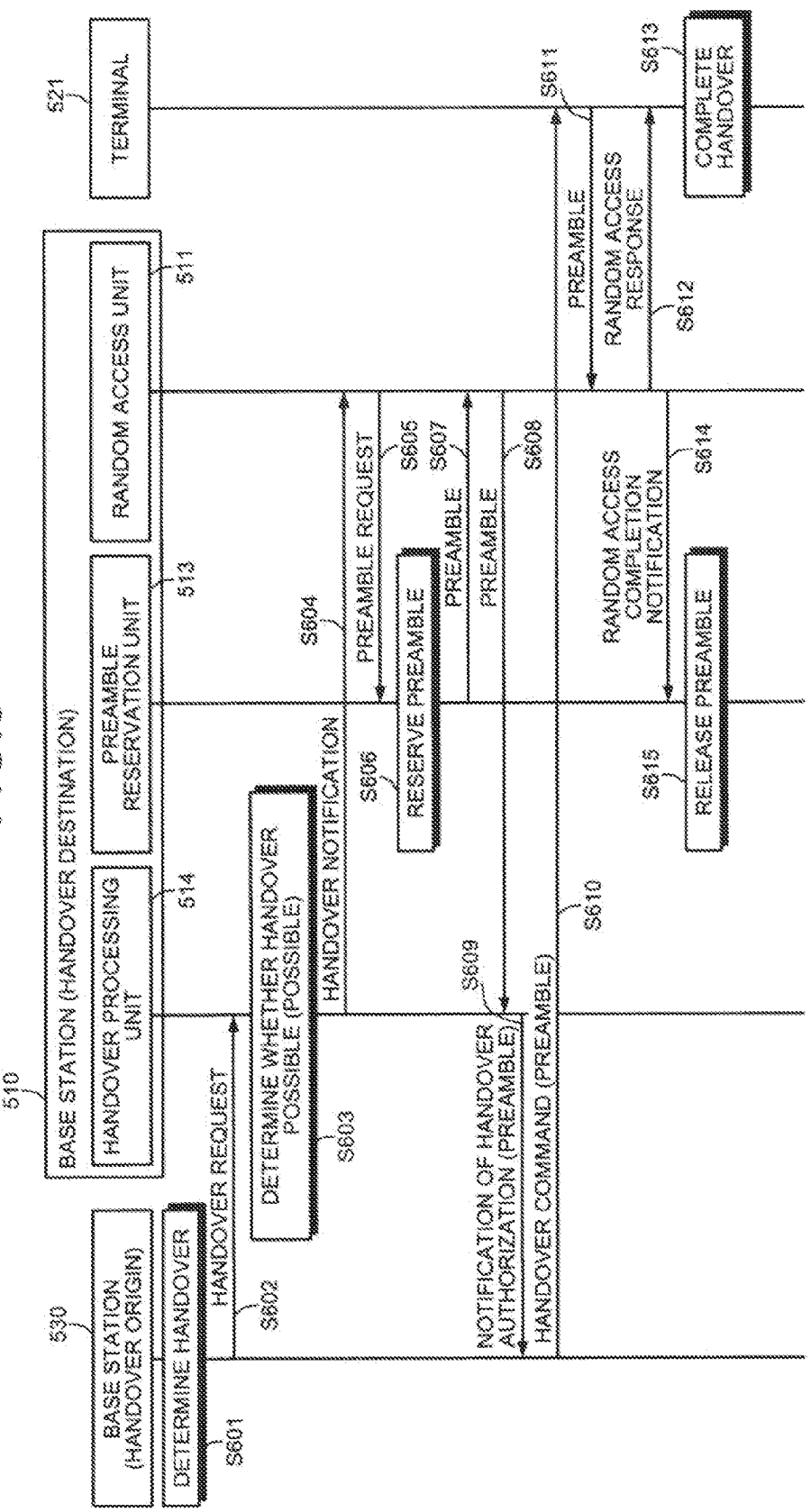
FIG. 6 is a sequence diagram of an example of handover operation.

FIG. 6 is a sequence diagram of an example of handover operation. In FIG. 6, an example will be described in which a terminal 521 included in the terminal group 520 depicted in FIG. 5 is handed over from the base station 530 to the base station 510. First, the base station 530 decides to handover the terminal 521 to the base station 510 (step S601).

Next, the base station 530 transmits to the base station 510, a handover request (step S602). The handover processing unit 514 of the base station 510 determines whether handover based on the handover request received at step S602 is possible (step S603). In this example, the handover processing unit 514 determines that handover is possible.

The handover processing unit 514 outputs to the random access unit 511, handover notification (step S604). The random access unit 511 outputs to the preamble reservation unit 513, a preamble request for the handover based on the handover notification received at step S604 (step S605).

Based on the preamble request received at step S605, the preamble reservation unit 513 reserves a preamble (step S606) and outputs the reserved preamble (dedicated code) to the random access unit 511 (step S607).

The random access unit 511 outputs to the handover processing unit 514, the preamble received at step S607 (step S608). The handover processing unit 514 transmits to the base station 530, notification of handover authorization that includes the preamble received at step S608 (step S609).

The base station 530 transmits to the terminal 521, the handover command that includes the preamble included in the notification of handover authorization received at step S609 (step S610). Next, the terminal 521 begins handover processing that includes non-contention random access to the base station 510. For example, the terminal 521 transmits to the base station 510 by RACH, the preamble included in the handover command received at step S610 (step S611).

Preamble code transmitted at step S611 is dedicated code and therefore, the random access unit 511 can identify the terminal 521 in a short period of time. Subsequently, the random access unit 511 transmits to the terminal 521, a random access response (step S612), whereby the terminal 521 completes handover (step S613).

Further, the random access unit 511 outputs to the preamble reservation unit 513, random access completion notification that indicates that handover has been completed (step S614). The preamble reservation unit 513 releases the preamble reserved at step S606 (step S615), ending a series of operations.

Figure 7:
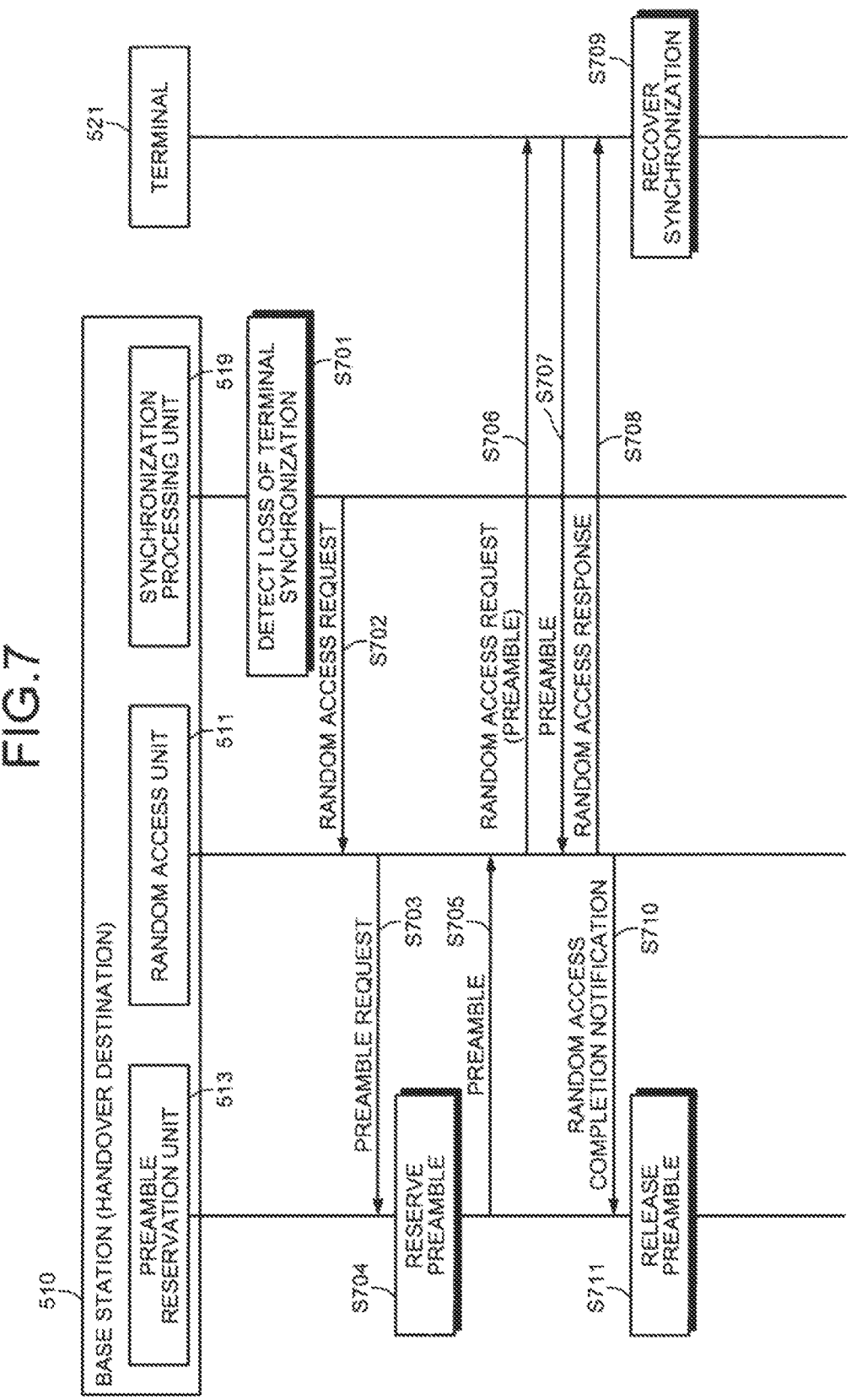
FIG. 7 is a diagram depicting an example of operation for synchronization recovery.

FIG. 7 is a diagram depicting an example of operation for synchronization recovery. In FIG. 7, an example will be described in which the terminal 521 connected to the base station 510 has lost uplink synchronization with the base station 510. First, the synchronization processing unit 519 detects non-synchronization of the terminal 521 with the base station 510 by a timeout (step S701).

Next, the synchronization processing unit 519 outputs to the random access unit 511, a random access request requesting random access to recover synchronization of the terminal 521 (step S702). The random access unit 511 outputs to the preamble reservation unit 513, a preamble request for random access based on the random access request received at step S702 (step S703).

The preamble reservation unit 513 reserves a preamble, based on the preamble request received at step S703 (step S704). Subsequently, the preamble reservation unit 513 outputs to the random access unit 511, the preamble (dedicated code) reserved at step S704 (step S705).

The random access unit 511 transmits to the terminal 521, a random access request that includes the preamble received at step S705 (step S706). Subsequently, the terminal 521 transmits to the base station 510, by a RACH, the preamble received at step S706 (step S707).

Preamble code transmitted at step S707 is dedicated code and therefore, the random access unit 511 can identify the terminal 521 in short period of time. Subsequently, the random access unit 511 transmits to the terminal 521, a random access response (step S708), whereby the terminal 521 completes random access and recovers uplink synchronization with the base station 510 (step S709).

Further, the random access unit 511 outputs to the preamble reservation unit 513, random access completion notification that indicates that random access has been completed (step S710). The preamble reservation unit 513 releases the preamble reserved at step S704 (step S711), ending a series of operations.

Figure 8:
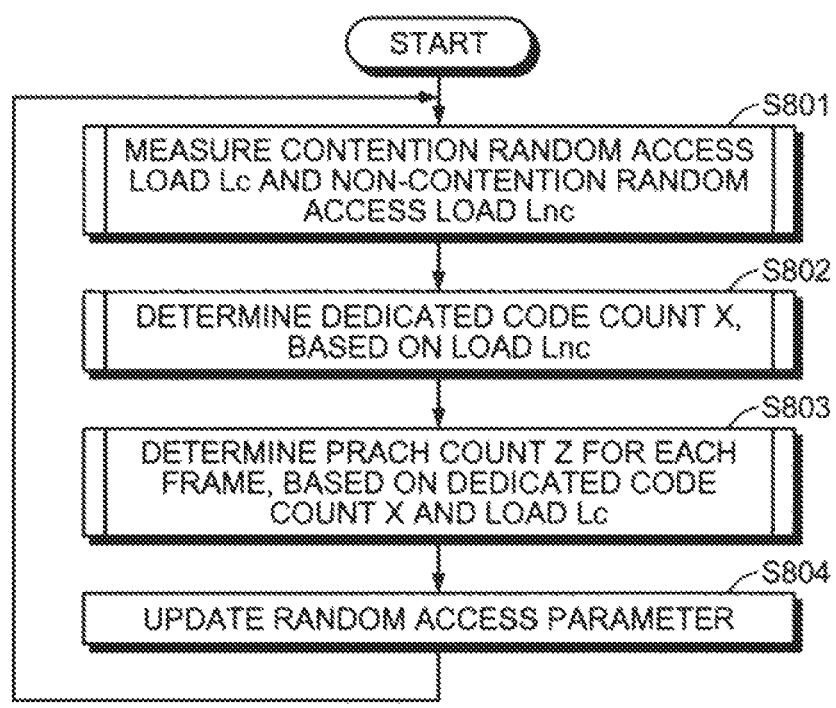
FIG. 8 is a flowchart of base station processing.

FIG. 8 is a flowchart of base station processing. The base station 510, for example, by executing the steps depicted in FIG. 8, measures random access load and updates a parameter. First, the load measuring unit 516 measures contention random access load Lc and non-contention random access load Lnc (step S801). A detailed example of step S801 is described hereinafter (see, for example, FIG. 9).

The first parameter determining unit 517, based on the non-contention random access load Lnc measured at step S801, determines the dedicated code count X (step S802). For example, the first parameter determining unit 517 determines the dedicated code count X such that the insufficiency Pr, which is fallback from non-contention random access to contention random access, becomes equal to or less than a threshold THcfb. The threshold THcfb is, for example, set by the operator. A detailed example of step S802 will be described hereinafter (see, for example, FIG. 10).

The second parameter determining unit 518 determines the PRACH count Z, based on the dedicated code count X determined at step S802 and the contention random access load Lc measured at step S801 (step S803). For example, the second parameter determining unit 518 determines the PRACH count Z such that the collision rate occurring in contention random access becomes equal to or less than a threshold THc. The threshold THc is, for example, set by the operator. A detailed example of step S803 will be described hereinafter (see, for example, FIG. 11).

The random access unit 511 updates the random access parameter, which includes the dedicated code count X determined at step S802 and the PRACH count Z determined at step S803 (step S804), and the flow returns to step S801.

Figure 9:
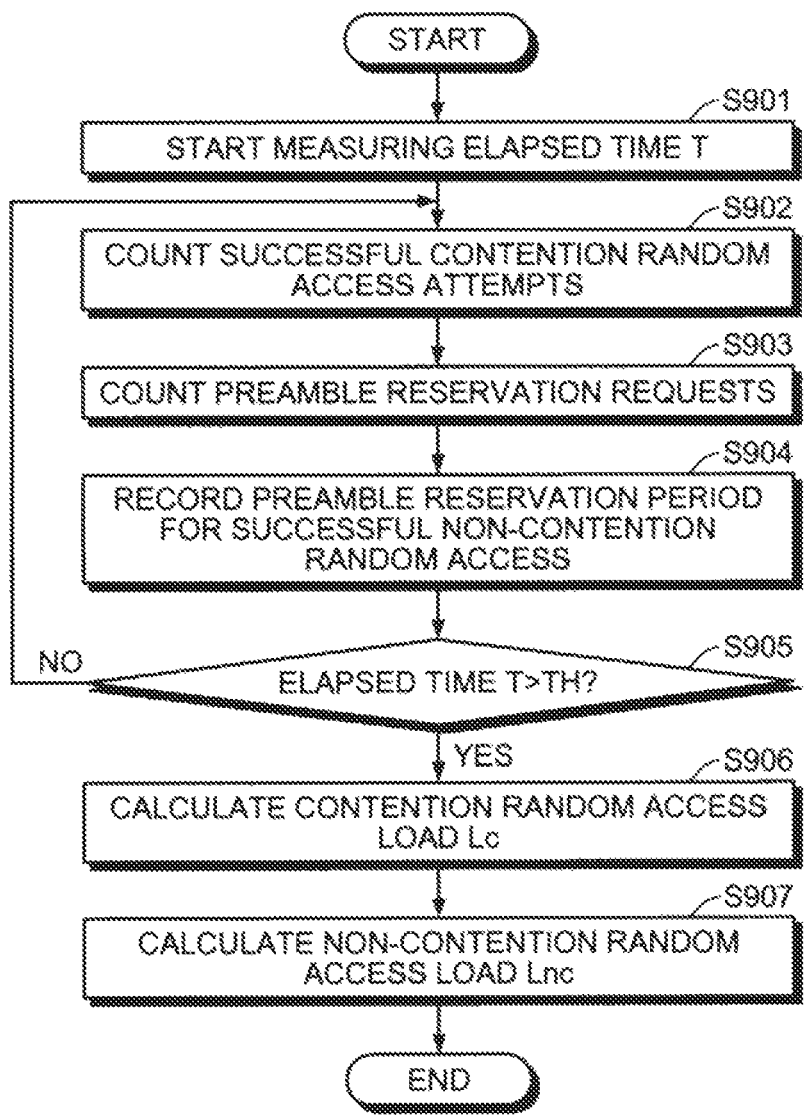
FIG. 9 is a flowchart depicting an example of random access load measurement processing.

FIG. 9 is a flowchart depicting an example of random access load measurement processing. At step S801 in FIG. 8, the load measuring unit 516 measures the load Lc and the load Lnc by, for example, the steps depicted in FIG. 9. First, the load measuring unit 516 starts measuring the elapsed time T by a timer (step S901).

The load measuring unit 516 counts the number of successful contention random accesses (step S902) For example, the load measuring unit 516 counts the number of successful contention random accesses by acquiring the number of contention resolution messages sent by the random access unit 511 to a terminal. Subsequently, the load measuring unit 516 counts the number of preamble (dedicated code) reservation requests to the base station 510 (step S903). For example, the load measuring unit 516 acquires the number of preamble requests from the random access unit 511 to the preamble reservation unit 513.

The load measuring unit 516 records the period from preamble reservation until release (reservation period Mrt), for successful non-contention random accesses (step S904). Since a reserved preamble cannot be used for any other non-contention random access, in order to calculate the number of preambles (dedicated codes) available per frame, the load measuring unit 516 records the preamble reservation period Mrt.

The load measuring unit 516 determines whether the elapsed time T initiated at step S901 has exceeded the threshold TH (step S905). The threshold TH is determined such that a sufficient sample is obtained to measure random access load. If the elapsed time T has not exceeded the threshold TH (step S905: NO), the flow returns to step S902.

At step S905, if the elapsed time T has exceeded the threshold TH (step S905: YES), the load measuring unit 516 calculates the contention random access load Lc (step S906). The contention random access load Lc can be calculated, for example, by dividing by the elapsed time T, the number of successful contention random accesses counted at step S902 until the elapsed time T exceeds the threshold TH.

The load measuring unit 516 calculates the non-contention random access load Lnc (step S907). The non-contention random access load Lnc is calculated, for example, by the total number of preamble reservation requests counted at step S903 until the elapsed time T exceeds the threshold TH. By the steps depicted in FIG. 9, the contention random access load Lc and the non-contention random access load Lnc can be calculated.

Figure 10:
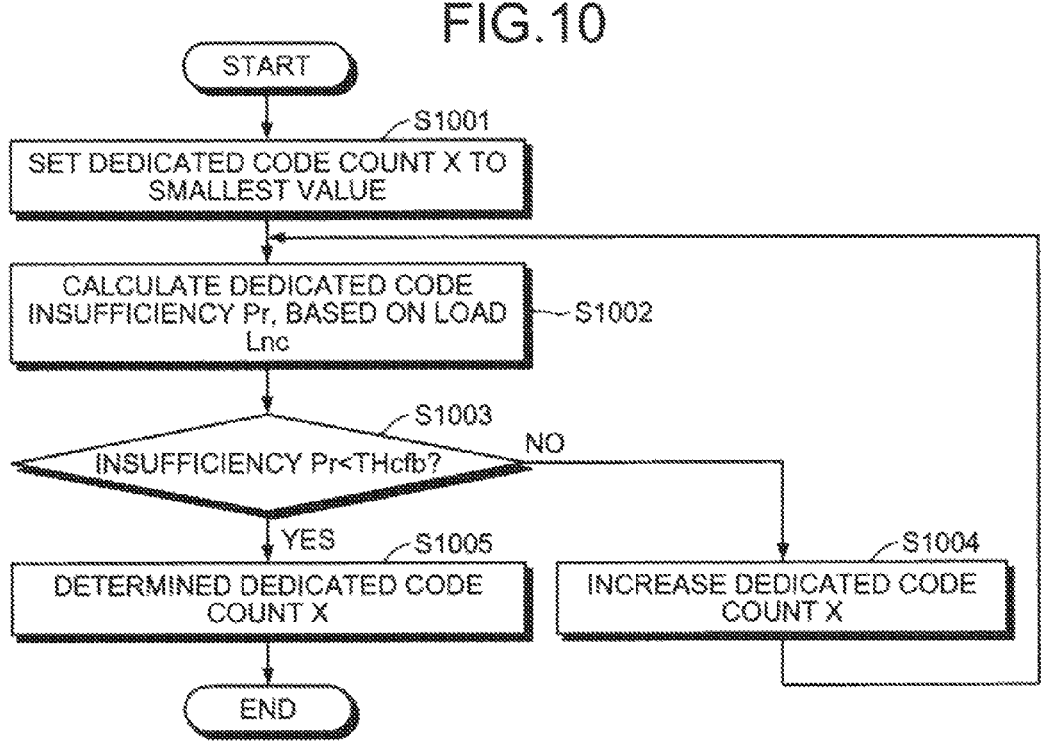
FIG. 10 is a flowchart depicting processing for determining a dedicated code count.

FIG. 10 is a flowchart depicting processing for determining the dedicated code count. At step S802 depicted in FIG. 8, the first parameter determining unit 517 determines the dedicated code count X, for example, by the steps depicted in FIG. 10. First, the first parameter determining unit 517 sets the dedicated code count X to a minimum value (step S1001). The minimum value of the dedicated code count X is preliminarily set by the operator and for example, is 0.

The first parameter determining unit 517, based on the non-contention random access load Lnc calculated at step S802 depicted in FIG. 8, calculates the dedicated code insufficiency Pr (contention fallback occurrence rate) (step S1002). For example, the first parameter determining unit 517 calculates the number of preamble reservation requests per reservation period Mrt, whereby the rate at which a state where reservation requests exceed the number of available preambles occurs is calculated. Calculation of the dedicated code insufficiency Pr will be described hereinafter.

The first parameter determining unit 517 determines whether the insufficiency Pr calculated at step S1002 is less than the threshold THcfb (step S1003). If the insufficiency Pr is not less than threshold THcfb (step S1003: NO), the first parameter determining unit 517 increases the dedicated code count X by one unit (step S1004), and the flow returns to step S1002. At step S1004, the first parameter determining unit 517, for example, increases the dedicated code count X by a changing unit of 4.

At step S1003, if the insufficiency Pr is less than the threshold THcfb (step S1003: YES), the first parameter determining unit 517 determines the dedicated code count X as the current value (step S1005), ending a series of processes. Further, the shared code count is 64-X. By the steps above, the first parameter determining unit 517 can determine the dedicated code count X such that the dedicated code insufficiency Pr is less than the threshold THcfb.

Figure 11:
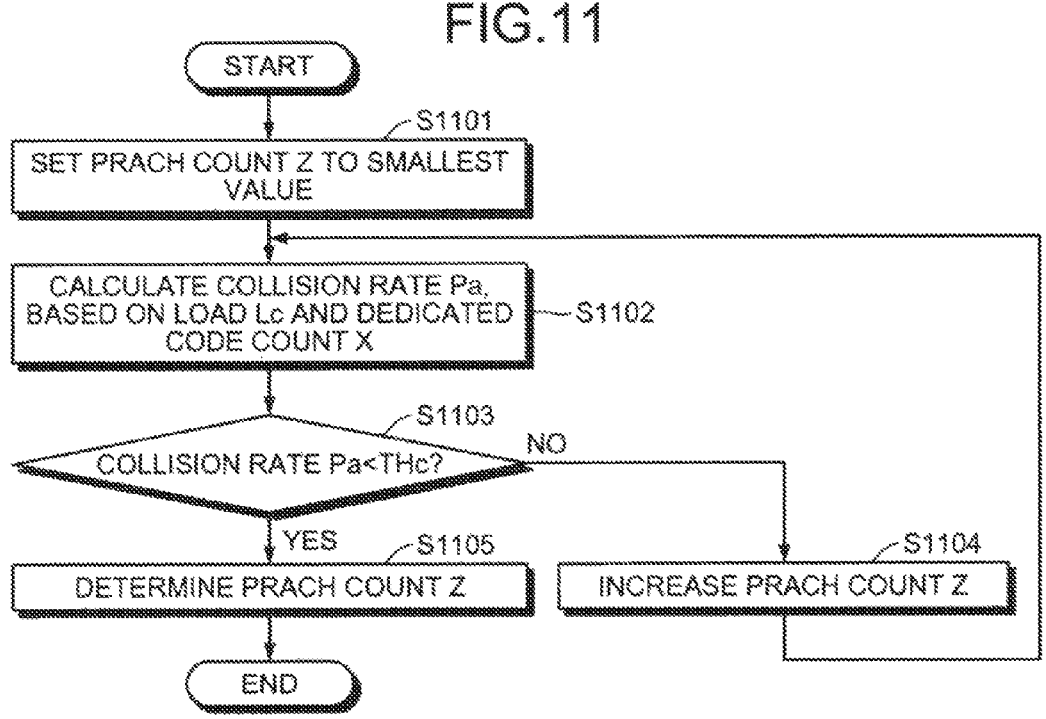
FIG. 11 is a flowchart depicting an example of PRACH count calculation processing.

FIG. 11 is a flowchart depicting an example of PRACH count calculation processing. At step S803 depicted in FIG. 8, the second parameter determining unit 518, for example, determines the PRACH count Z for each frame by the steps depicted in FIG. 11. First, the second parameter determining unit 518 sets the PRACH count Z to a minimum value (step S1101). The minimum value of the PRACH count Z is preliminarily set by the operator and is, for example, 0.5.

Subsequently, the second parameter determining unit 518, based on the contention random access load Lc measured at step S801 and the dedicated code count X determined at step S802, calculates a contention random access collision rate Pa (step S1102). Calculation of the contention random access collision rate Pa is described hereinafter.

The second parameter determining unit 518 determines whether the contention random access collision rate Pa calculated at step S1102 is less than the threshold TH (step S1103). If the contention random access collision rate Pa is not less than the threshold TH (step S1103: NO), the second parameter determining unit 518 increases the PRACH count Z by one unit (step S1104), and the flow returns to step S1102. At step S1104, the second parameter determining unit 518 increases the PRACH count to, for example, 0.5, 1, 2, 3, 5, 10, . . . .

At step S1103, if the collision rate Pa is less than the threshold THc (step S1103: YES), the second parameter determining unit 518 determines the PRACH count Z per frame as the current value (step S1105), ending a series of processes. By the steps above, the second parameter determining unit 518 can determine the PRACH count Z per frame such that the contention random access collision rate Pa is less than the threshold THc.

In the base station 510 operation depicted in FIGS. 8 to 11, the cycle UI at which random access parameters, such as the dedicated code count X and the PRACH count Z are sent to the terminal (updated), can be adjusted by the threshold TH (UI≈TH). The random access parameter(s) are sent during the paging cycle of the base station 510 by broadcast. Consequently, the random access parameter(s), for example, can be sent once every 640 [ms] to 40960 [ms] cycle.

Therefore, the cycle UI, for example, is determined by multiplying the paging cycle of the base station 510 by a coefficient. As the coefficient, for example, a modification period coefficient complying with LTE can be used. For example, if the paging cycle is 64 and the coefficient is 4, the cycle UI is 64*4=256[frame]=2[sec]560 [ms]. Further, if the paging cycle changes during operation, based on the changed paging cycle, the cycle UI (threshold TH) may be updated.

Next, a detailed description of calculation of the dedicated code insufficiency Pr that is based on the non-contention random access load Lnc will be described (step S1002 in FIG. 10). The first parameter determining unit 517 can calculate the dedicated code insufficiency Pr (fallback from non-contention random access to contention random access) using equation 1 below.

$$Pr = CF/Lnc \quad (1)$$

The contention fallback count per period CF can be calculated, for example, by calculating a contention fallback count Mcf per preamble reservation period Mrt and dividing the contention fallback count Mcf by the preamble reservation period Mrt. The reservation period Mrt is the preamble reservation period recorded at step S904.

Lnc is the non-contention random access load Lnc measured at step S801 depicted in FIG. 8 and represents the number of attempts per non-contention random access period. CF is the number of contention fallbacks per period. Thus, the dedicated code insufficiency Pr can be calculated by dividing the contention fallbacks per period CF by the number of attempts per non-contention random access period.

For example, the contention fallback count per period CF can be calculated by equation 2 below. Consequently, even if there are various the preamble reservation periods, the contention fallback count per period CF can be calculated.

$$CF = Mcf/Mrt \quad (2)$$

The contention fallback count Mcf per preamble reservation period Mrt, for example, can be calculated by equation 3 below.

$$Mcf = \sum_{Y=X+1}^{\infty} (Y-X) \cdot P(Y) \quad (3)$$

(Y−X) is the number of insufficient dedicated codes of the dedicated code count X relative to the non-contention random access attempts Y. P(Y) is the probability that the non-contention random access attempts are Y. P(Y), for example, can be set as a probability distribution. Since, non-contention random access attempts are independent, as the probability distribution, for example, Poisson distribution can be used. Therefore, the dedicated code insufficiency Pr can be calculated, for example, by equation 4 below.

$$Pr = \frac{\sum_{Y=X+1}^{\infty} (Y-X) \cdot P(Y)}{Lnc \cdot Mrt} \quad (4)$$

Next, a detailed calculation example for the contention random access collision rate Pa, which is based on the contention random access load Lc and the dedicated code count X (step S1102 in FIG. 11) will be described. The second parameter determining unit 518, for example, using a Poisson distribution can calculate the contention random access collision rate Pa (refer to, for example, R2-062833 and R2-0702063 of GPP). For example, the second parameter determining unit 518 can calculate the contention random access collision rate Pa by equation 5 below.

$$Pa = 1 - e^{-\lambda c} \quad (5)$$

λc is the number of successful contention random accesses per shared code (attempts-collision count). Therefore, if there are no collisions (collision count=0), λc is the contention random access attempts per shared code. The second parameter determining unit 518, for example, can calculate λc by equation 6 below.

$$\lambda c = \frac{Lc}{Z \cdot CP} \quad (6)$$

Lc is the contention random access load Lc measured at step S801 and indicates the number of successful access attempts per contention random access period. Z is the PRACH count Z per frame. CP is the shared code count per PRACH (CP=64−X).

If the contention random access collision rate Pa is calculated by equation 5, the attempts per period become numerous consequent to the occurrence of contention random access collisions. For example, if the calculated collision rate Pa is 4 percent and the contention random access load Lc is 570, the actual random access attempts per period is 570*1.04=576.8.

For example, by using Newton's Method, the attempts per contention random access period can be calculated. By using the calculated attempts per contention random access period in equation 5, the contention random access collision rate Pa can be calculated.

Figure 12:
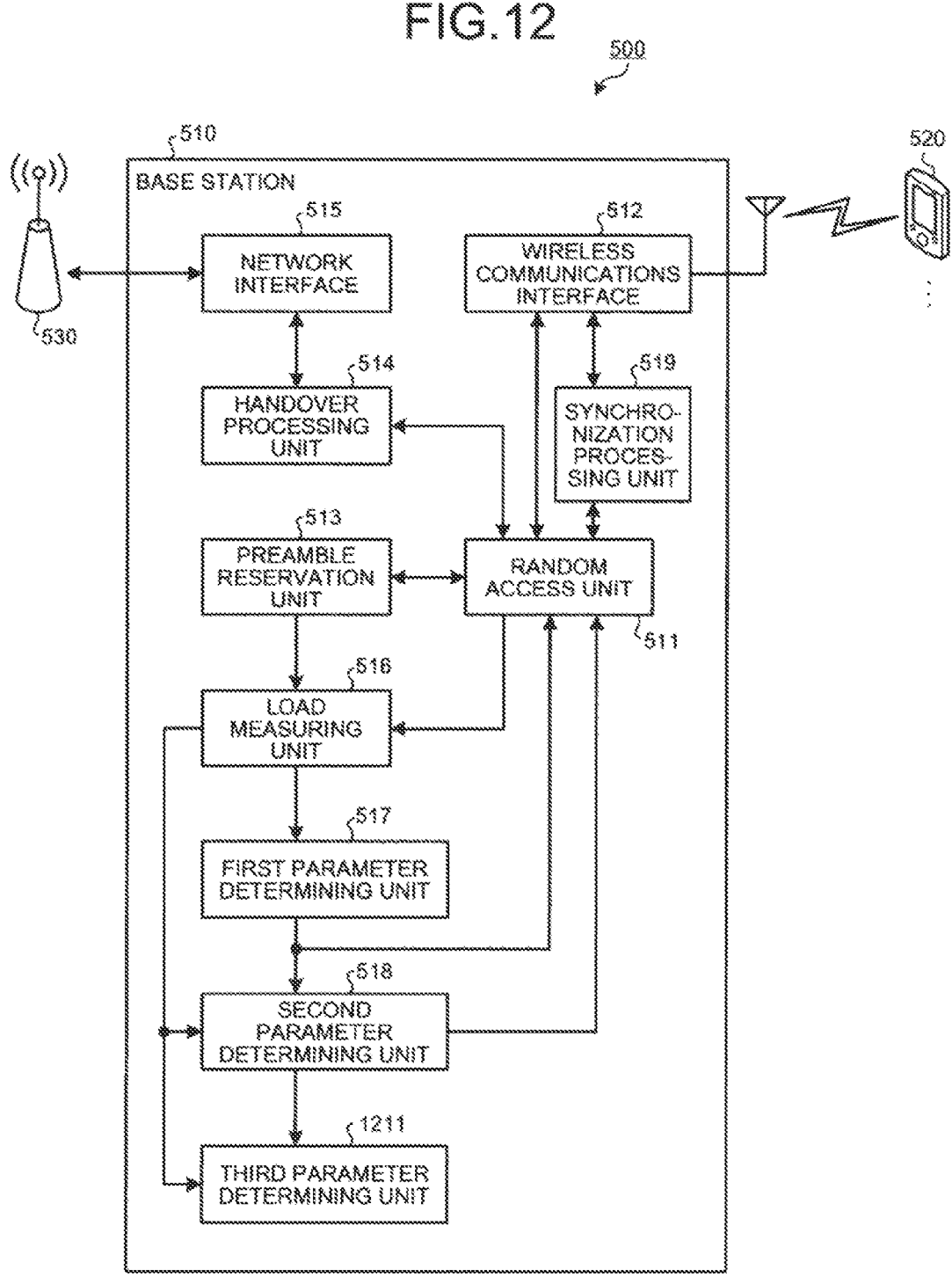
FIG. 12 is a diagram of the communication system according to a second example.

FIG. 12 is a diagram of the communication system according to a second example. In FIG. 12, components identical to those depicted in FIG. 5 are given the same reference numerals used in FIG. 5 and description thereof is omitted. As depicted in FIG. 12, the base station 510 according to the second example further includes a third parameter determining unit 1211 in addition to the configuration depicted in FIG. 5. The third parameter determining unit 1211 can be implemented by one or more DSPs.

The random access unit 511 according to the second example divides the terminal group 520 into terminal group A and terminal group B (terminal groups) and manages the terminal groups. Classification of the terminal groups is, for example, performed by terminal signal strength, the amount of data to be transmitted after random access, etc. The random access unit 511 allocates shared code to the terminal group A and the terminal group B, respectively. The load measuring unit 516 measures the contention random access load Lc for the terminal group A and the terminal group B, respectively.

Based on the contention random access load Lc output for each terminal group from the load measuring unit 516, the third parameter determining unit 1211 determines a shared code count for each terminal group. The third parameter determining unit 1211 outputs to the random access unit 511, the shared code count determined for each terminal group. The random access unit 511 performs contention random access using the shared code count for each terminal group received from the third parameter determining unit 1211.

Figure 13:
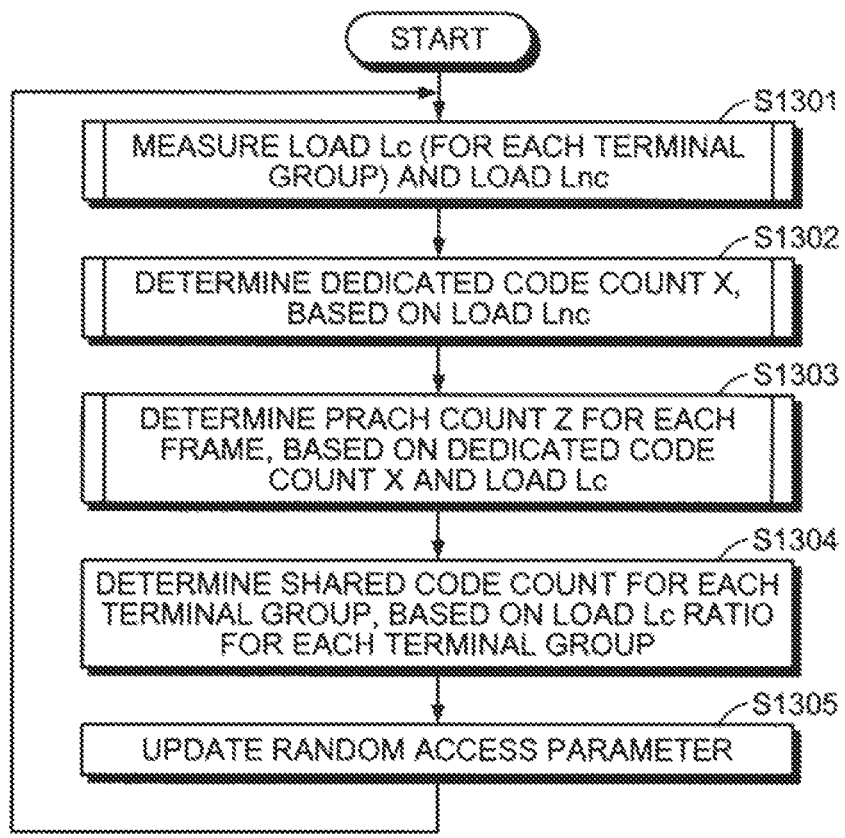
FIG. 13 is a flowchart of an example of processing by the base station according to the second example.

FIG. 13 is a flowchart of an example of processing by the base station according to the second example. The base station 510 according to the second example, for example, by executing the steps depicted in FIG. 13, measures the random access load and updates a parameter(s). Steps S1301 to S1303 depicted in FIG. 13 are identical to steps S801 to S803 depicted n FIG. 8.

However, at step S1301, the load measuring unit 516 measures the contention random access load Lc for each terminal group. Further, at step S1303, the load measuring unit 516, using the sum of the contention random access loads Lc measured at step S1301 for each terminal group, determines the PRACH count Z per frame.

Subsequent to step S1303, the third parameter determining unit 1211, based on the ratio of contention random access loads Lc measured for the terminal groups at step S1301, determines the shared code count for the terminal groups, respectively (step S1304). For example, the third parameter determining unit 1211 calculates the shared code count for terminal group A by (load Lc for terminal group A/total load Lc for terminal groups)*shared code.

For example, if the dedicated code count calculated at step S1302 is 16, the shared code count is 64−16=48. Further, if the load Lc (number of successful contention random accesses) for terminal group A is 125 and the load Lc for terminal group B is 25, the third parameter determining unit 1211 calculates the shared code count for terminal group A as (125/150)*48=40.

However, for example, under LTE, since the shared code count is a multiple of 4, if the calculated count is not a multiple of 4, the third parameter determining unit 1211 determines the shared code count for terminal group A as the nearest multiple of 4. If the shared code count for terminal group A is 40, the third parameter determining unit 1211 determines the shared code count for terminal group B as the shared code count-shared code count for terminal group A=48−40=8.

Subsequently, the random access unit 511 updates the random access parameter (step S1305), and the flow returns to step S1301. The parameter updated at step S1305 includes the dedicated code count X determined at step S1302, the PRACH count Z determined at step S1303, and the shared code counts for each of the terminal groups determined at step S1304. In this manner, the shared code count may be determined for each terminal group.

Figure 14:
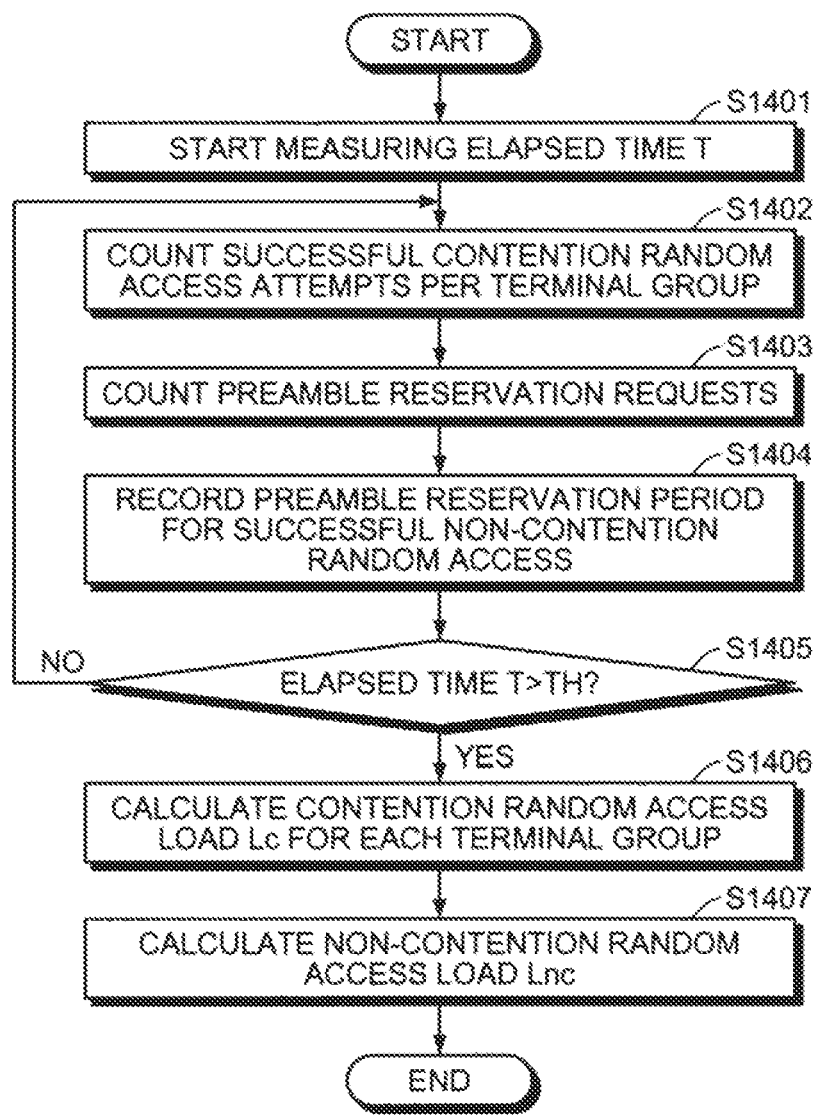
FIG. 14 is a flowchart of an example of load calculation for each terminal group.

FIG. 14 is a flowchart of an example of load calculation for each terminal group. Steps S1401 to S1407 depicted in FIG. 14 are identical to steps S901 to S907 depicted in FIG. 9. However, at step S1402, the load measuring unit 516 counts the number of successful contention random accesses for each terminal group. Further, at step S1406, the load measuring unit 516, based on the number of successful contention random accesses counted for each terminal group at step S1402, calculates the contention random access load Lc for each terminal group.

The contention random access load Lc and the non-contention random access load Lnc measured by the load measuring unit 516, for example, may include an error compared to the actual load caused by a burst effect resulting from a sudden change in the random access attempts in a short period.

Therefore, the load measuring unit 516 of the base station 510 according to a third example corrects the measured non-contention random access load Lnc by the standard deviation of the non-contention random access load. As a result, the first parameter determining unit 517 can determine the dedicated code count X, based on the non-contention random access load Lnc corrected according to the degree of error.

Further, the load measuring unit 516 of the base station 510 according to the third example corrects the measured contention random access load Lc by the standard deviation of the contention random access load. As a result, the second parameter determining unit 518 can determine the PRACH count Z, based on the contention random access load Lc corrected according to the degree of error.

Figure 15:
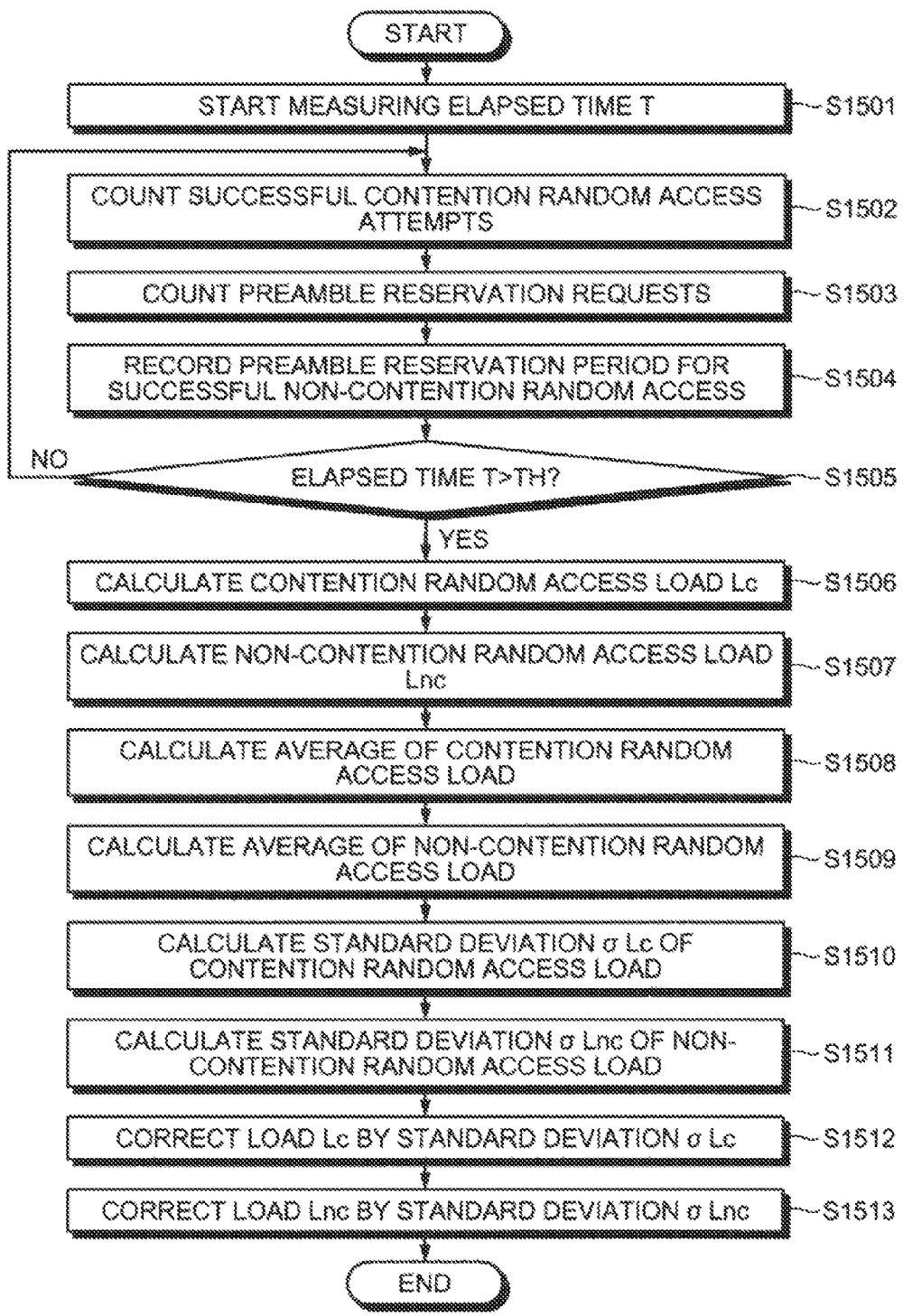
FIG. 15 is a flowchart of an example of random access load measurement.

FIG. 15 is a flowchart of an example of random access load measurement. The load measuring unit 516 of the base station 510 according to the third example may measure the load Lc and the load Lnc at step S801 depicted in FIG. 8, for example, by the steps depicted in FIG. 15. Steps S1501 to S1507 depicted in 15 are identical to steps S901 to S907 depicted in FIG. 9.

Subsequent to step S1507, the load measuring unit 516 calculates the average contention random access load for a measuring interval (step S1508). The average contention random access load is, for example, the average number of successful contention random accesses repeatedly counted at step S1502 until the elapsed time T exceeds the threshold TH.

The load measuring unit 516 calculates the average non-contention random access load for a measuring interval (step S1509). The average non-contention random access load is, for example, the average number of preamble reservation requests repeatedly counted at step S1503 until the elapsed time T exceeds the threshold TH.

The load measuring unit 516, based on the average calculated at step S1508, calculates the standard deviation σLc for contention random access load (step S1510). The standard deviation σLc for contention random access load is, for example, the standard deviation of the number of successful contention random accesses repeatedly counted at step S1502 until the elapsed time T exceeds the threshold TH.

The load measuring unit 516, based on the average calculated at step S1509, calculates the standard deviation σLnc for non-contention random access load (step S1511). The standard deviation σLnc for non-contention random access load is, for example, the standard deviation of the number of preamble reservation requests repeatedly counted at step S1503 until the elapsed time T exceeds the threshold TH.

The load measuring unit 516, based on the standard deviation σLc calculated at step S1510, corrects the load Lc calculated at step S1506 (step S1512). For example, the load measuring unit 516 corrects the load Lc by Lc=Lc+A*σLc. Coefficient A is, for example, preliminarily set by the operator.

Using the standard deviation σLnc calculated at step S1511, the load measuring unit 516 corrects the load Lnc calculated at step S1507 (step S1513), ending a series of processes. For example, the load measuring unit 516 corrects the load Lnc by Lnc=Lnc+B*σLnc. Coefficient B is, for example, preliminarily set by the operator.

In this manner, the greater the calculated standard deviation, the more the calculated load is increased for correction. As a result, the greater error of the measured load Lc and load Lnc, the larger the value the load Lc and the load Lnc can be corrected to. Thus, contention random access collisions consequent to measurement errors of the contention random access load Lc and dedicated code insufficiency consequent to measurement errors of the non-contention random access load Lnc can be suppressed.

Non-contention random access includes non-contention random access for handover and non-contention random access for non-handover (synchronization recovery, positioning service, etc.). Non-contention random access for handover (first non-contention random access) consumes time from preamble reservation until preamble transmission (see, for example, FIG. 6). On the other hand, non-contention random access for non-handover (second non-contention random access) consumes relatively less time from dedicated code reservation to preamble transmission because the process is for a terminal already connected to the base station 510 (see, for example, FIG. 7).

Therefore, the load Lnc and the dedicated code insufficiency Pr differ respectively in non-contention random access for handover and in non-contention random access for non-handover. As a result, the optimal dedicated code count X for non-contention random access for handover and for non-contention random access for non-handover differs.

Thus, the base station 510 according to a fourth example calculates the dedicated code count X respectively for non-contention random access for handover and for non-contention random access for non-handover. As a result, an optimal dedicated code count X is calculated respectively for non-contention random access for handover and for non-contention random access for non-handover, whereby the time consumed for random access can be further reduced.

Figure 16:
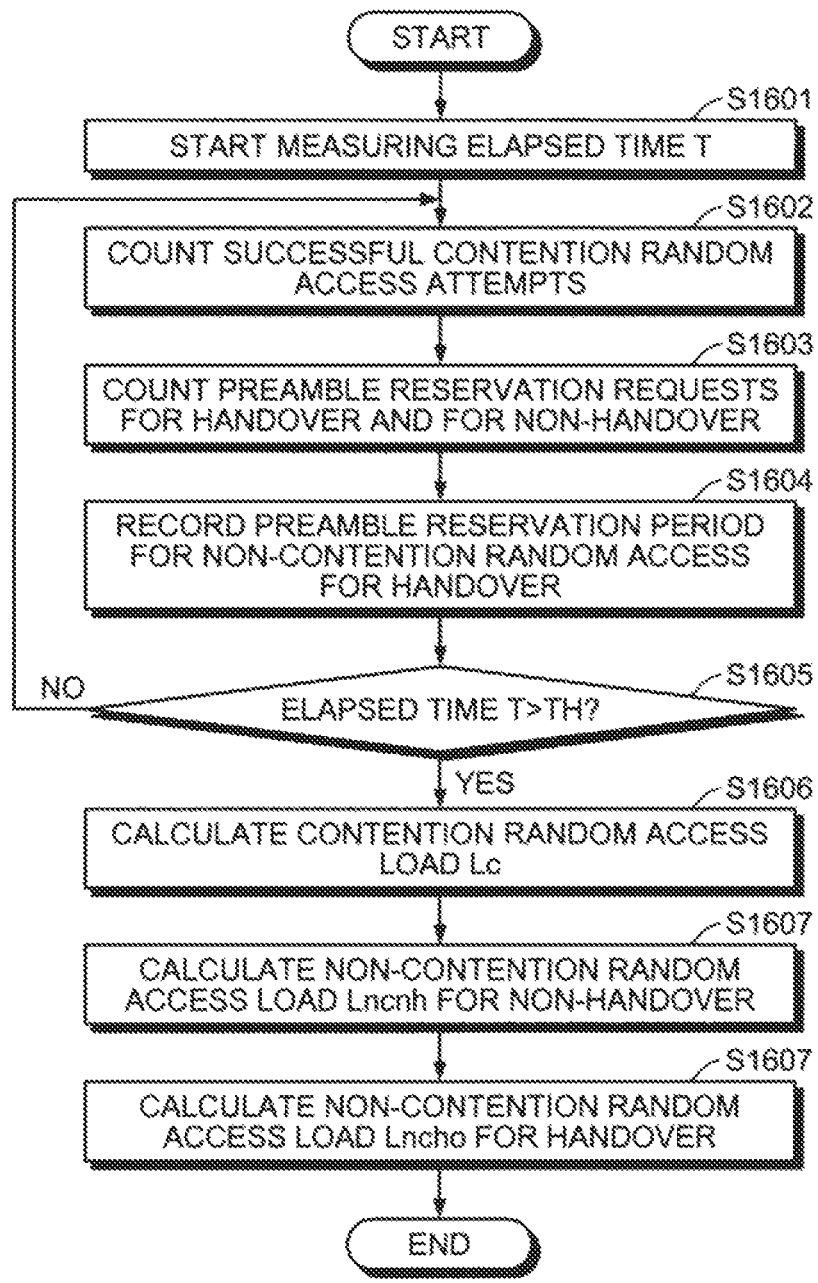
FIG. 16 is a flowchart of an example of random access load calculation.

FIG. 16 is a flowchart of an example of random access load calculation. The load measuring unit 516 of the base station 510 according to the fourth example may calculate the load Lc and the load Lnc at step S801 depicted in FIG. 8 by, for example, the steps depicted in FIG. 16. Steps S1601 to S1606 depicted in FIG. 16 are identical to steps S901 to S906 depicted in FIG. 9.

However, at step S1603, the load measuring unit 516 counts the number of preamble reservation requests for non-contention random access for handover and for non-contention random access for non-handover, respectively.

Further, at step S1604, the load measuring unit 516 records the reservation period Mrt of preambles for non-contention random access for handover, among the successful non-contention random accesses. This is because dedicated code is reserved and non-contention random access attempts for non-handover are executed at a timing when there is no reservation period Mrt.

Subsequent to step S1606, the load measuring unit 516 calculates the non-contention random access load Lncnh for non-handover (step S1607). The non-contention random access load Lncnh is, for example, the number of preamble reservation requests for non-contention random access for handover, repeatedly counted at step S1603 until the elapsed time T exceeds the threshold TH.

The load measuring unit 516 calculates the non-contention random access load Lncho for handover (step S1608). The non-contention random access load Lncho is calculated by, for example, the total number of preamble reservation requests for non-contention random access for non-handover, repeatedly counted at step S1603 until the elapsed time T exceeds the threshold TH.

Figure 17:
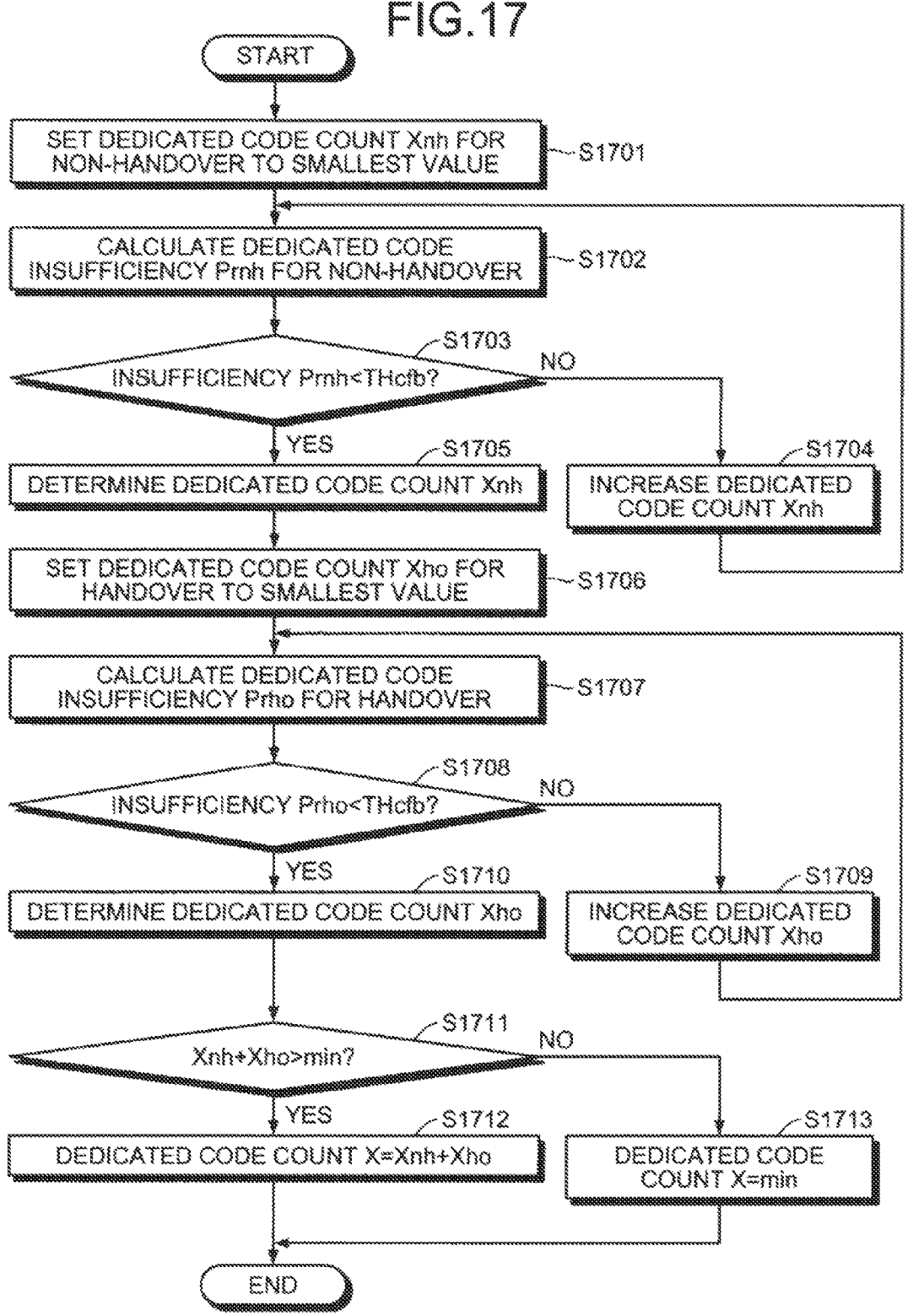
FIG. 17 is a flowchart of an example of dedicated code count determination.

FIG. 17 is a flowchart of an example of dedicated code count determination. The first parameter determining unit 517 of the base station 510 according to the fourth example determines the dedicated code count X at step S802 depicted in FIG. 8 by, for example, the steps depicted in FIG. 17. First, the first parameter determining unit 517 sets the dedicated code count Xnh for non-contention random access for non-handover to a minimum value (step S1701). The minimum value of the dedicated code count Xnh (e.g., 0) is preliminarily set by the operator.

The first parameter determining unit 517 calculates the dedicated code insufficiency Prnh for non-contention random access for non-handover (step S1702). The dedicated code insufficiency Prnh is calculated based on the non-contention random access load Lncnh for non-handover calculated at step S1607 in FIG. 16. Calculation of the dedicated code insufficiency Prnh is identical to that for the dedicated code insufficiency Pr described above.

The first parameter determining unit 517 determines whether the insufficiency Prnh calculated at step S1702 is less than the threshold THcfb (step S1703). If the insufficiency Prnh is not less than the threshold THcfb (step S1703: NO), the first parameter determining unit 517 increases the dedicated code count Xnh by one unit (step S1704), and the flow returns to step S1702. At step S1704, the first parameter determining unit 517, for example, increases the dedicated code count Xnh by a changing unit of 4.

At step S1703, if the insufficiency Prnh is less than the threshold THcfb (step S1703: YES), the first parameter determining unit 517 determines the dedicated code count Xnh as the current value (step S1705). By the steps above, the first parameter determining unit 517 can determine the dedicated code count Xnh for non-contention random access for non-handover such that the dedicated code insufficiency Prnh is less than the threshold THcfb.

The first parameter determining unit 517 sets the dedicated code count Xho for non-contention random access for handover to a minimum value (step S1706). The minimum value of the dedicated code count Xho (e.g., 0) is preliminarily set by the operator.

The first parameter determining unit 517 calculates the dedicated code insufficiency Prho for non-contention random access for handover (step S1707). The dedicated code insufficiency Prho is calculated based on the non-contention random access load Lncho for handover, calculated at step S1608 depicted in FIG. 16. Calculation of the dedicated code insufficiency Prho is identical to that for the dedicated code insufficiency Pr described above.

The first parameter determining unit 517 determines whether the insufficiency Prho calculated at step S1707 is less than the threshold THcfb (step S1708). If the insufficiency Prho is not less than the threshold THcfb (step S1708: NO), the first parameter determining unit 517 increases the dedicated code count Xho by one unit (step S1709), and the flow returns to step S1707. At step S1709, the first parameter determining unit 517, for example, increases the dedicated code count Xho by a changing unit of 4.

At step S1708, if the insufficiency Prho is less than the threshold THcfb (step S1708: YES), the first parameter determining unit 517 determines the dedicated code count Xho as the current value (step S1710). By the steps above, the first parameter determining unit 517 can determine the dedicated code count Xho for non-contention random access for handover such that the dedicated code insufficiency Prho is less than the threshold THcfb.

The first parameter determining unit 517 determines whether the sum of the dedicated code count Xnh determined at step S1705 and the dedicated code count Xho determined at step S1710 (Xnh+Xho) is greater than a threshold min (step S1711). If Xnh+Xho is greater than the threshold min (step S1711: YES), the dedicated code count X is determined as Xnh+Xho (step S1712), ending a series of processes.

However, for example, under LTE, since the dedicated code count X is a multiple of 4, if the calculated count is not a multiple of 4, the dedicated code count X is determined as the multiple of 4 closest to, but greater than the calculated count. For example, if the calculated Xnh+Xho is 14, the dedicated code count X is determined as 16, the multiple of 4 closest to, but greater than 14.

At step S1711, if Xnh+Xho is not greater than the threshold min (step S1711: NO), dedicated code count X is determined as the threshold min (step S1713), ending a series of processes.

The random access parameter is sent during the paging cycle of the base station 510 by broadcast. Consequently, if the random access parameter is updated frequently, the loads of the base station 510 and the terminal group 520 become large.

Thus, the random access unit 511 according to a fifth example does not update the dedicated code count X if the difference of the dedicated code count X determined by the first parameter determining unit 517 and the current dedicated code count set for non-contention random access is less than or equal to a threshold. In this case, the random access unit 511 controls non-contention random access using the current dedicated code count.

Further, if the difference of the PRACH count Z determined by the second parameter determining unit 518 and the current PRACH count Z set for contention random access is less than or equal to a threshold, the random access unit 511 does not update the PRACH count Z. In this case, the random access unit 511 controls contention random access using the current PRACH count.

Figure 18:
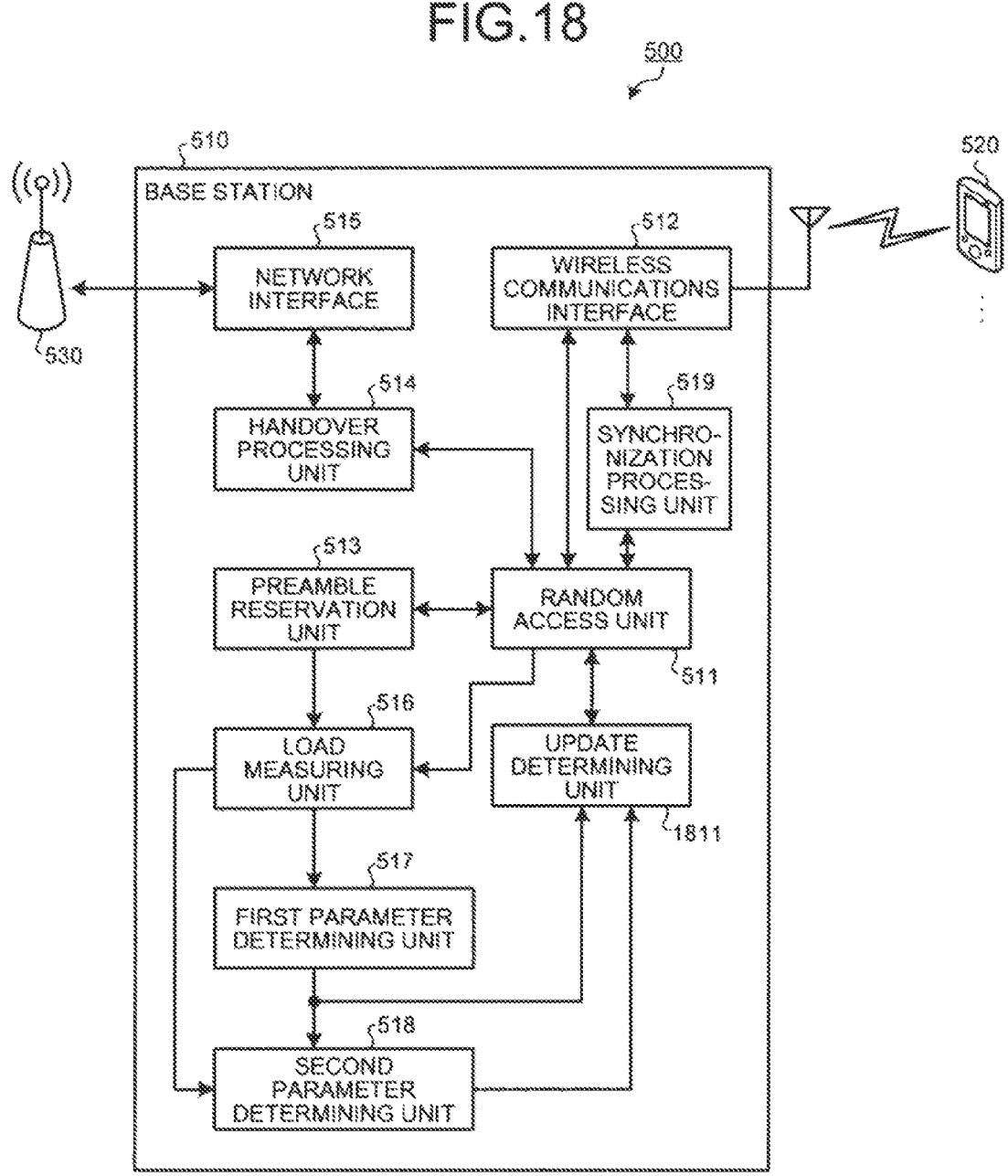
FIG. 18 is a diagram of the communication system according to the fifth example.

FIG. 18 is a diagram of the communication system according to the fifth example. In FIG. 18, components identical to those depicted in FIG. 5 are given the same reference numerals used in FIG. 5 and description therefor is omitted. As depicted in FIG. 18, the base station 510 according to the fifth example further includes an updating unit 1811 in addition to the configuration depicted in FIG. 5. The first parameter determining unit 517 outputs the determined parameter (dedicated code count X) to the updating unit 1811. The second parameter determining unit 518 outputs the determined parameter (PRACH count Z) to the updating unit 1811.

The updating unit 1811 acquires from the random access unit 511, the parameters currently used by the random access unit 511. Further, the updating unit 1811, with respect to at least one among the parameter output from the first parameter determining unit 517 and the parameter output from the second parameter determining unit 518, calculates the difference thereof with the parameter currently used by the random access unit 511.

Subsequently, the updating unit 1811 outputs to the random access unit 511, the parameters for which the calculated difference is greater than a threshold. As a result, the parameter is updated at the random access unit 511. Further, the updating unit 1811 does not output to the random access unit 511, the parameters for which the calculated difference is not greater than the threshold. In this case, the parameter is not updated at the random access unit 511. The updating unit 1811 can be implemented by, for example, one or more DSPs.

FIG. 19 is a flowchart of an example of processing by the base station according to the fifth example. The base station 510 according to the fifth example, for example, measures random access load and updates parameters by the steps depicted in FIG. 19. Steps S1901 to S1903 depicted in FIG. 19 are identical to steps S801 to S803 depicted in FIG. 8.

Subsequent to step S1903, the updating unit 1811 acquires the current parameter N and the previous parameter O (step S1904). The current parameter N includes the dedicated code count X and the PRACH count Z determined at steps S1902 and S1903 immediately before. The previous parameter O, for example, is acquired from the random access unit 511.

Next, the updating unit 1811 determines whether the difference (|O-N|) of the parameter N and the parameter O acquired at step S1904 is greater than a threshold cTH (step S1905). The threshold cTH, for example, is preliminarily set by the operator. For example, the updating unit 1811 determines if the difference of the previous and the current dedicated code count X, and the difference of the previous and the current PRACH count Z are greater than the threshold cTH. If the difference of parameter N and parameter O is not greater than the threshold cTH (step S1905: NO), the flow returns to step S1901.

At step S1905, if the difference of the parameter N and the parameter O is greater than the threshold cTH (step S1905: YES), the flow transitions to step S1906. Step S1906 is identical to step S804 depicted in FIG. 8.

Here, although an example has been described where at step S1905, it is determined whether the dedicated code count X difference and the PRACH count Z difference are greater than the threshold cTH, configuration may be such that it is determined whether at least the dedicated code count X difference or the PRACH count Z difference is greater than the threshold cTH. In this case, the updating unit 1811 transitions to step S1906 with respect to the dedicated code count X or the PRACH count Z, for which the difference is greater than the threshold cTH. Further, the updating unit 1811 returns to step S1901 with respect to the dedicated code count X or the PRACH count Z, for which the difference is not greater than the threshold cTH.

FIG. 20 is a graph depicting the time reduction for optimization of the dedicated code count. In FIG. 20, the horizontal axis represents the cycle at which the RACH parameter is updated and the vertical axis represents the dedicated code count X. Characteristic 2001 depicts changes in the dedicated code count X at each cycle of a conventional base station that repeatedly increases the random access parameter until the RACH quality is optimized. As depicted by characteristic 2001, in the conventional the base station, multiple cycles are required until the dedicated code count X is optimized and converges (in this example, 4 cycles).

Characteristic 2002 depicts changes in the dedicated code count X at each cycle of the base station 510. As depicted by characteristic 2002, since the base station 510 measures the non-contention random access load Lnc and based on the measurement results, determines the optimal dedicated code count X, the dedicated code count X can be converged in one cycle. Similarly for the PRACH count Z, since the base station 510 measures the contention random access load Lc and based on the measurement results, determines the optimal PRACH count Z, the PRACH count Z can be converged in one cycle. As a result, according to the base station 510, the random access parameter is optimized, enabling a reduction in the time consumed for improvement of random access quality.

Further, if multiple random access parameters are controlled, since the updating of one parameter affects quality with respect to another parameter, in the conventional base station, it takes more time for the parameters to optimally converge. On the contrary, the base station 510 determines the dedicated code count X and based on the dedicated code count X and the contention random access load Lc, determines the PRACH count Z, whereby the dedicated code count X and the PRACH count Z can be determined in one cycle.

As described, according to the base station and the control method, the time consumed for random access can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A base station that controls random access that includes non-contention random access in which the base station allocates to each terminal, a dedicated code as a preamble, the base station comprising:
 a wireless communications interface; and
 a processor configured
  to measure non-contention random access load received by the wireless communications interface;
  to determine a dedicated code count, based on the non-contention random access load measured; and
  to control the non-contention random access using the dedicated code count determined.

2. The base station according to claim 1, wherein
to determine the dedicated code count the processor is configured to calculate dedicated code insufficiency, based on the non-contention random access load and to determine whether the calculated insufficiency is less than a threshold.

3. The base station according to claim 1, wherein
to measure the non-contention random access load, the processor is configured to measure the number of dedicated code requests received by the base station.

4. The base station according to claim 1, wherein
to measure the non-contention random access load, the processor is configured to correct the measured non-contention random access load by standard deviation of the non-contention random access, and
to determine the dedicated code count, the processor is configured to determine the dedicated code count, based on the corrected non-contention random access load.

5. The base station according to claim 1, wherein
to measure the non-contention random access load, the processor is configured to measure loads including that for first non-contention random access and second non-contention random access, where the first non-contention random access is for handover and is among the non-contention random access and the second non-contention random access is different from the first non-contention random access, and
to determine the dedicated code count, the processor is configured to determine, based on the measured loads, the dedicate code count, respectively, for the first non-contention random access and the second non-contention random access.

6. The base station according to claim 1, wherein
to control the non-contention random access, the processor is configured to control the non-contention random access by the dedicated code count currently set for the non-contention random access, if the difference of the determined dedicated code count and the dedicated code count currently set for the non-contention random access is less than or equal to a threshold.

7. The base station according to claim 1, wherein
the base station controls random access that includes the non-contention random access and contention random access in which shared code selected by a terminal is regarded as a preamble,
the processor is configured
to measure contention random access load,
to determine a physical channel count for the random access, based on the contention random access load measured, and
to control the random access by the determined physical channel count.

8. The base station according to claim 7, wherein
to determine the physical channel count for random access, the processor is configured to calculate a collision rate for the contention random access, based on the contention random access load and to determine the physical channel count such that the calculated collision rate becomes lower than a threshold.

9. The base station according to claim 7, wherein
to measure the contention random access load, the processor is configured to measure the number of successful contention random accesses.

10. The base station according to claim 7, wherein
to determine the physical channel count for random access, the processor is configured to determine the dedicated code count and based on the determined dedicated code count and the contention random access load, to determine the physical channel count.

11. The base station according to claim 7, wherein
the communications unit respectively allocates a shared code to a plurality of terminal groups,
to measure contention random access load, the processor is configured to measure the contention random access load for each terminal group,
to determine the physical channel count for random access, the processor is configured to determine a shared code count for each terminal group, based on the contention random access load measured for each terminal group.

12. The base station according to claim 7, wherein
to measure the contention random access load, the processor is configured to correct the measured contention random access load by standard deviation of the contention random access load,
to determine the physical channel count for the random access, the processor is configured to determine the physical channel count, based on the corrected contention random access load.

13. The base station according to claim 7, wherein
to control the random access, the processor is configured to control the contention random access by the physical channel count currently set for the contention random access, if the difference of the determined physical channel count and the physical channel count currently set is less than or equal to a threshold.

14. A base station that controls random access that includes contention random access in which a shared code selected by a terminal is regarded as a preamble, the base station comprising:
a wireless communications interface; and
a processor configured
to measure contention random access load received by the wireless communications interface;
to determine a physical channel count for the random access, based on the measured contention random access load; and
to control the random access by the determined physical channel count.

15. A control method performed by a base station that controls random access that includes non-contention random access in which the base station allocates to each terminal, a dedicated code as a preamble, the control method comprising:
measuring non-contention random access load;
determining a dedicated code count, based on the non-contention random access load measured at the measuring; and
controlling the non-contention random access by the determined dedicated code count.

* * * * *